United States Patent
Ramesh

(10) Patent No.: US 10,693,637 B2
(45) Date of Patent: Jun. 23, 2020

(54) SYSTEM AND METHOD FOR COMPOSITE-KEY BASED BLOCKCHAIN DEVICE CONTROL

(71) Applicant: Belavadi Nagarajaswamy Ramesh, Bangalore (IN)

(72) Inventor: Belavadi Nagarajaswamy Ramesh, Bangalore (IN)

( * ) Notice: Subject to any disclaimer, the term of this patent is extended or adjusted under 35 U.S.C. 154(b) by 60 days.

(21) Appl. No.: 16/101,452

(22) Filed: Aug. 12, 2018

(65) Prior Publication Data
US 2019/0296903 A1    Sep. 26, 2019

(30) Foreign Application Priority Data

Mar. 23, 2018   (IN) .............................. 201841010702

(51) Int. Cl.
*H04L 9/08* (2006.01)
*H04L 9/32* (2006.01)
*G06Q 20/40* (2012.01)

(52) U.S. Cl.
CPC .......... *H04L 9/0861* (2013.01); *H04L 9/3236* (2013.01); *H04L 9/3247* (2013.01); *G06Q 20/401* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | | | |
|---|---|---|---|---|
| 10,333,705 B2* | 6/2019 | Smith | ............. | G06Q 20/38215 |
| 10,366,062 B1* | 7/2019 | Lazier | ................... | G06F 3/061 |
| 10,521,196 B1* | 12/2019 | Wang | ..................... | G06F 8/34 |
| 2016/0300234 A1* | 10/2016 | Moss-Pultz | ............ | G06F 21/10 |
| 2017/0243193 A1* | 8/2017 | Manian | ............. | G06Q 20/3829 |
| 2017/0317997 A1* | 11/2017 | Smith | .................. | G06Q 20/401 |

FOREIGN PATENT DOCUMENTS

WO   WO-2017178956 A1 * 10/2017 ........... H04L 9/3242

\* cited by examiner

*Primary Examiner* — Kaveh Abrishamkar

(57) ABSTRACT

System and method for composite-key based blockchain device control, where the composite-key is created from control codes and a unique identification key. The control codes are used to control the blockchain device. The system uses the controlling system that can create controlling data. The system uses controlling data to control blockchain devices. The controlling data is used in conjunction with data in the blockchain. The system has methods for integrating with smart contracts to make execution of blockchain device depend on the smart contract. The system can be used for controlling financial activity, movement activity, asset activity, device activity, game activity. The system has methods for coupling controlling system with blockchain devices. The system has mechanisms to make blockchain device execution depend on the signature.

20 Claims, 23 Drawing Sheets

Architecture of solution

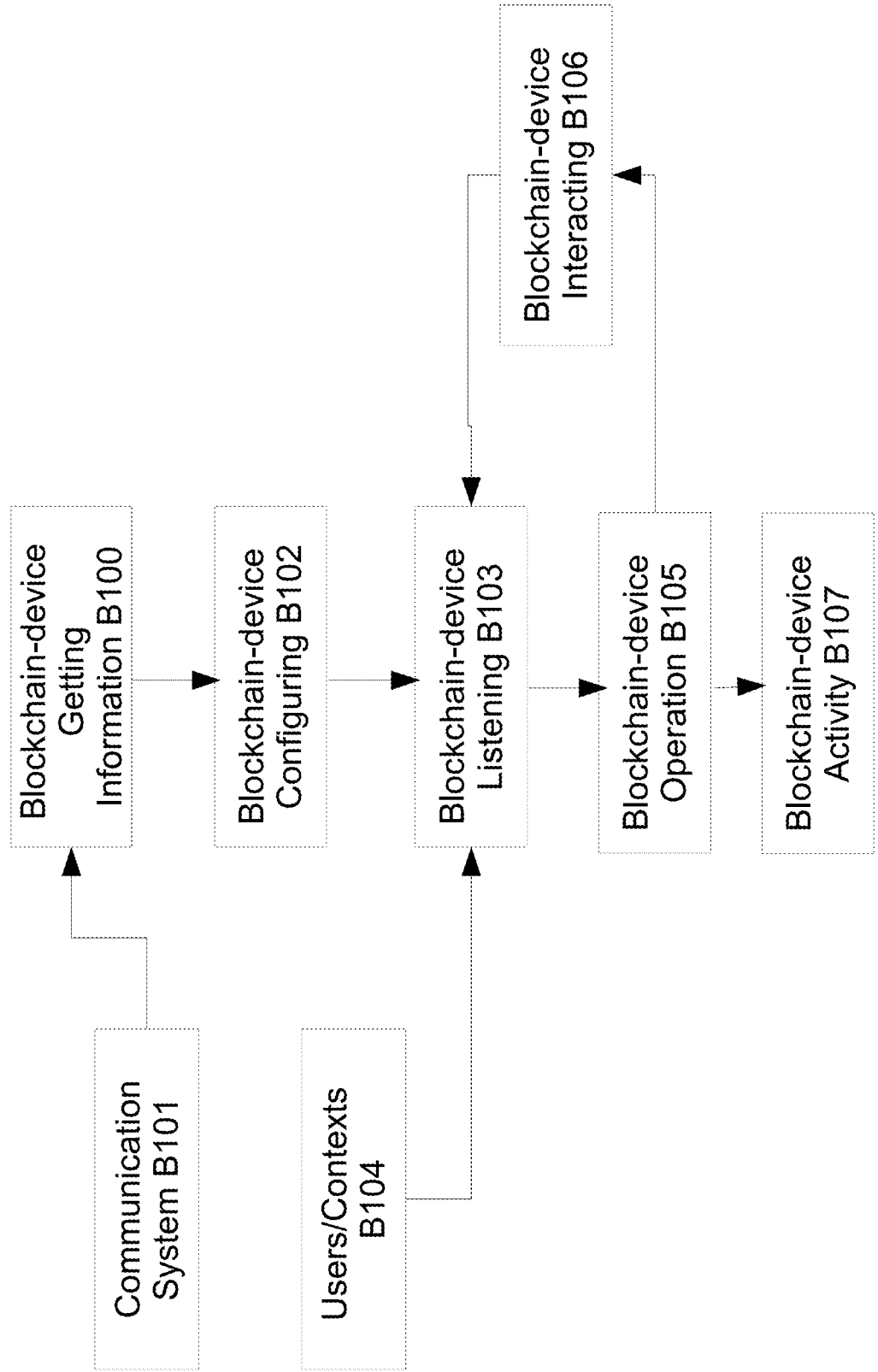

Figure 1A:
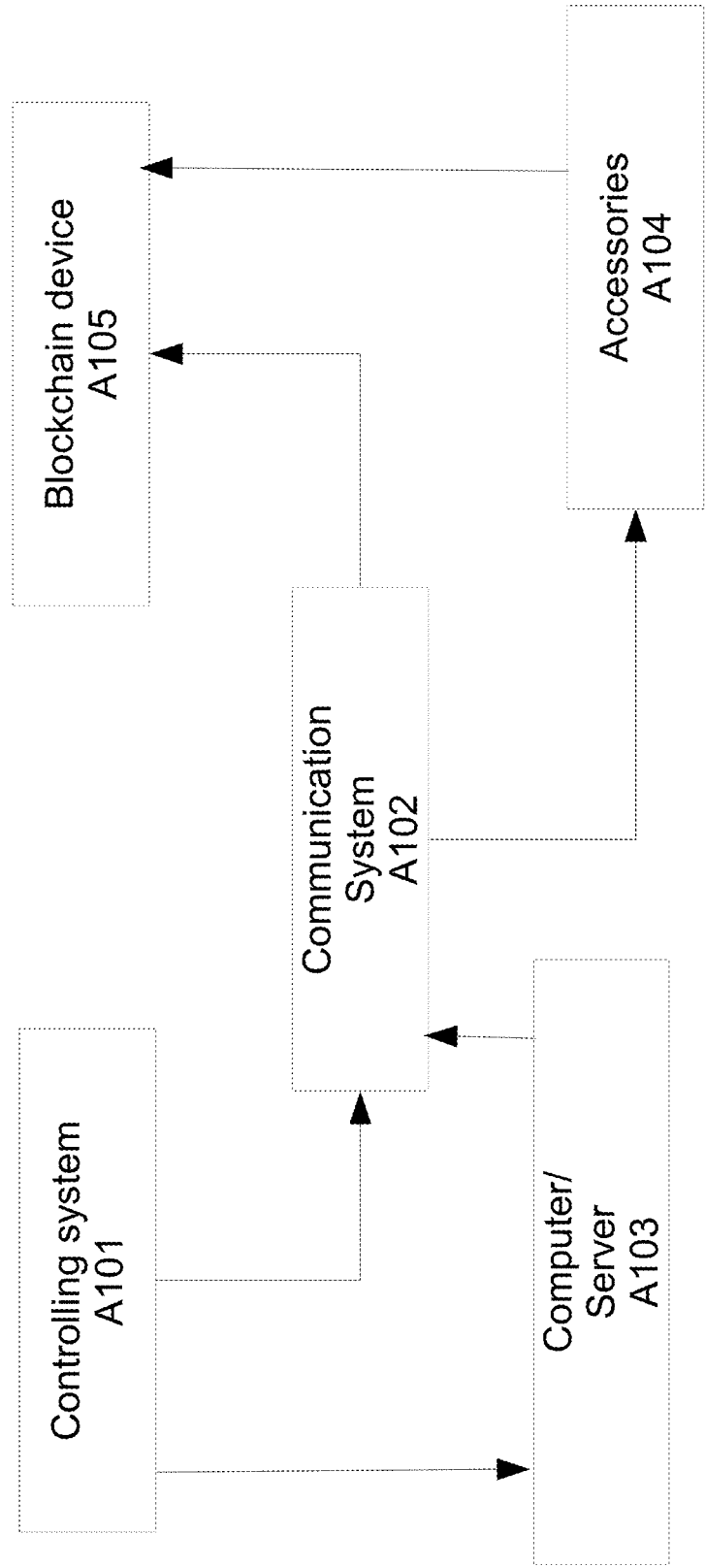

Example of control codes to be merged at location 10, 20 and end of UID-key.

var Pin = '1234';  A201 var Company = 'ABC';  A202 var Userjson = {  A203
Login:'user1',
Password : '<password>$_{hashhash}$'  A204
};

var Uidkey = keyPair.getPublicKeyBuffer();  A209 var part1 = Uidkey.slice (0,10);  A205
var part2 = Uidkey.slice (10,20);  A206
var part3 = Uidkey.slice (20);  A207

Composite-key plan = part1 + Userjson + part2 +Pin + part3 + Company  A208

FIG-2A

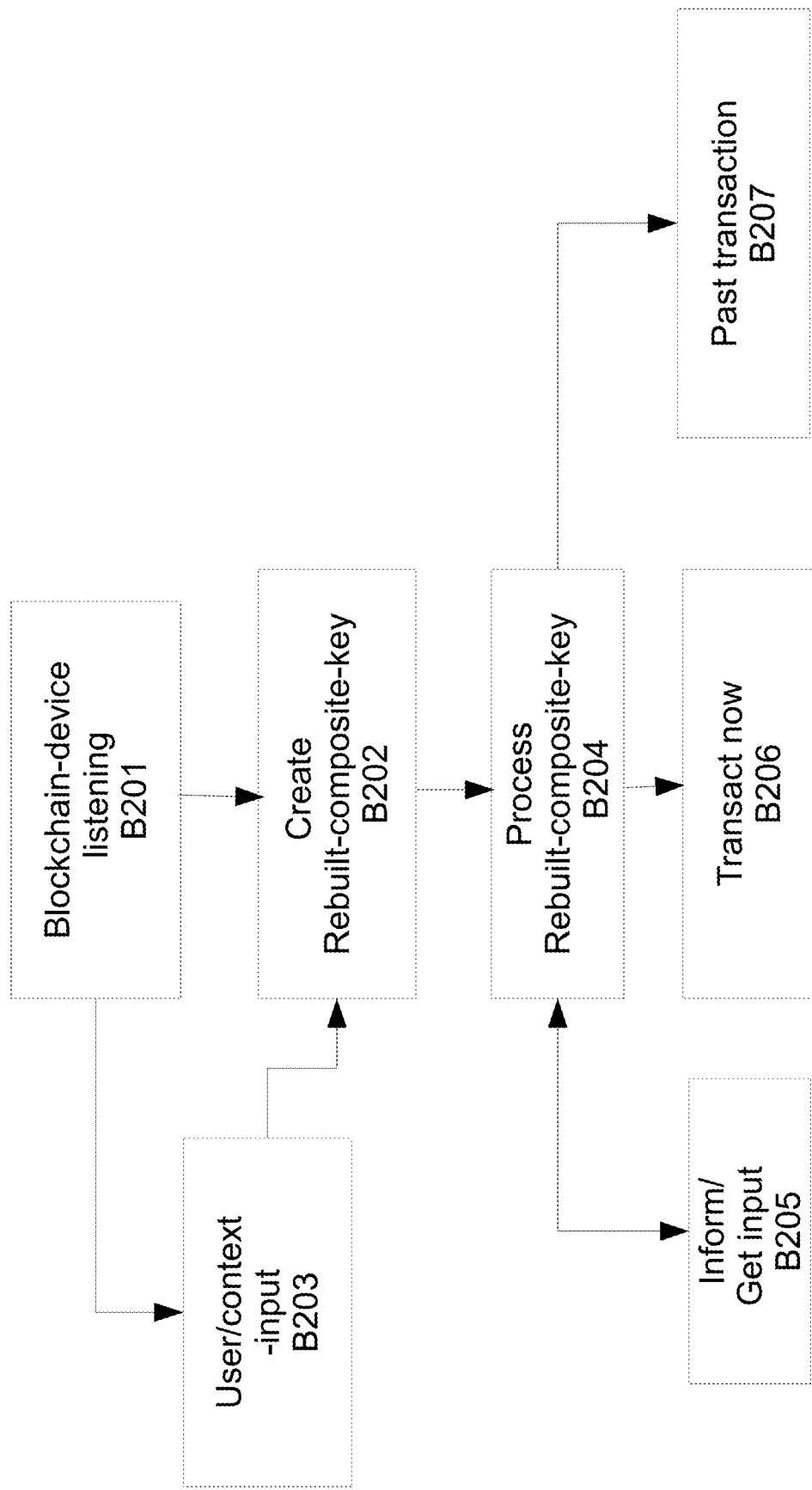

Steps for using custom-contract

```
CompositeRedeemScript =
    [bitcoin.opcodes.OP_HASH160, compositekeyHash, bitcoin.opcodes.OP_EQUAL]    C201

VerifyCompositeOutput = [bitcoin.opcodes.OP_VERIFY] ;                            C202

RedeemScript = <CompositeRedeemScript>.concat(<VerifyCompositeOutput>,<custom-contract>)    C203
```

FIG-2C

Example of composite-key creation

```
var Uidkey = keyPair.getPublicKeyBuffer();                              A301 var part1 = Uidkey.slice (0,10);                                        A302
var part2 = Uidkey.slice (10,20);                                       A303
var part3 = Uidkey.slice (20);                                          A304 var Pin = '1234';                                                       A305
var Pinkey = new Buffer(Pin, 'hex');                                    A306 var Company = 'ABC';                                                    A307
var Companykey = Buffer.from(Company);                                  A308
var password ='password1';                                              A309
var passwordbuf = Buffer.from(password);                                A310
var passwordhash = bitcoin.crypto.hash160(passwordbuf);                 A311
var passwordhashhash = bitcoin.crypto.hash160(passwordhash);            A312 var Userjson = {                                                        A313
  Login:'user1',
  Password : passwordhashhash.toString('hex')
};

var UserPin = JSON.stringify(Userjson);                                 A314
var Userpinkey = Buffer.from(UserPin);                                  A315
var compositearray = [new Buffer(part1,'hex'), Userpinkey,              A316
      new Buffer(part2, 'hex'), Pinkey,                                 A317
      new Buffer(part3, 'hex'),
      Companykey];

var compositekey = Buffer.concat(compositearray);                       A318
```

FIG-3A

Prior-art P2SH and standard redeemScript scriptPubKey: OP_HASH160 <scriptHash> OP_EQUAL  B301
scriptSig: <input to script> <serialized script>  B302 where <input to script>  will be redeem-input  B303
where <serialized script> will be redeemScript

The standard redeemScript and input to script are redeemScript: OP_DUP OP_HASH160 <pubKeyHash> OP_EQUALVERIFY OP_CHECKSIG  B304

Where <input to script> is below  B305
<sig> <pubKey>  B306

FIG-3B

Javascript example of using custom-contract

```
bitcoin = require('bitcoinjs-lib');                                                          
var keyPair = bitcoin.ECPair.makeRandom(bitcoin.networks.testnet);                           C301
var Uidkey = keyPair.getPublicKeyBuffer();                                                   C302
var OTP = '6784';                                                                            C303
var Pinkey = new Buffer(OTP, 'hex');                                                         C304
var arr = [Pinkey, Uidkey];                                                                  C305
var compositekey = Buffer.concat(arr);                                                       C306
var compositeKeyHash = bitcoin.crypto.hash160(compositekey);

var Pin1 = '1234';                                                                           C307
var Pin1Hash = bitcoin.crypto.hash160(new Buffer(Pin1, 'hex'));                              C308
var Pin2 = 'mypassword12';                                                                   C309
var Pin2buffer = bitcoin.crypto.hash160(Buffer.from(Pin2));                                  C310
var Pin2Hash = bitcoin.crypto.hash160(Pin2buffer);                                           C311 var customcontract =                                                                         C312
[bitcoin.opcodes.OP_HASH160, Pin1Hash, Pin2Hash, bitcoin.opcodes.OP_EQUALVERIFY,              C313
bitcoin.opcodes.OP_HASH160, Pin2Hash, bitcoin.opcodes.OP_EQUAL];                              C314 var redeemScript =                                                                           C315
    bitcoin.script.compile([bitcoin.opcodes.OP_HASH160, compositeKeyHash,                    C316
    bitcoin.opcodes.OP_EQUAL].concat([bitcoin.opcodes.OP_VERIFY],                            C317
    customcontract));                                                                        C318 var scriptPubKey = bitcoin.script.scriptHashOutput(bitcoin.crypto.hash160(redeemScript))     C319 var address = bitcoin.address.fromOutputScript(scriptPubKey, bitcoin.networks.testnet)       C320
```

FIG-3C

Example output of composite-key and redeem-script

Uidkey=02b621acc73f06fbd4cd682a0eda47b6d7317776607a8f02b68a30bf6bdfebee31    A401
Length=66    A402
part1 0-10= 02b621acc7    A403
part2 10-20= 3f06fbd4cd    A404
lastpart 20-last= 682a0eda47b6d7317776607a8f02b68a30bf6bdfebee31    A405 compositekey= 02b621acc77b224c6f6f696e223a227573657231222c22506173776f7264223a
2265336633316339313830376333636335383233343361313139653839383333343030656666613 76230
65227d3f06fbd4cd1234682a0eda47b6d7317776607a8f02b68a30bf6bdfebee31414243    A406 address=2Mui1Rbf6czDe3RozuWKZbMdcKYCMSHQXYG    A407

Pin=1234    A408
Company=ABC    A409
Userjson={"Login":"user1","Password":"e3f31c91807c3cc582343a119e8983400efa7b0e"}    A410 redeemScript=a9144a6ed75b9d255fbefc688482cedbdebfb7a65a3c87    A411

FIG-4A

P2SH and disclosure redeemScript scriptPubKey: OP_HASH160 <scriptHash> OP_EQUAL    B401
scriptSig: <input to script> <serialized script>    B402 where <input to script>    will be compositeKey    B403
where <serialized script> will be redeemScript    B404 compositeKey will be   [ <control-codes> <UID-key>]$_{processed}$    B405

The disclosure redeemScript and input to script are redeemScript: OP_HASH160 <compositeKeyHash> OP_EQUAL    B406

Where<input to script> is below    B407
<compositeKey>    B408

FIG-4B

Example of transaction with custom-contract address=2N7DZ1iasLDFrJ2s4PujTTphUx11qKyhrg7  C401
(control-code) OTP=6784  C402

(data for contract-input)  C403
Pin1=1234
Pin2=mypassword12  C404 redeemScript=a9144900b7db35741f5cb7f6eb1ea3c708cf7ac4e09e88a914c9440a6ff7e66 C405
be6ce4a3524a7c44f292a63153388a914aa5e8c44612ea01b64f65b597bfbe3f670ff7ed487

Uidkey=025dbd1b04f5c708e9f7775649ff89ec03dfef34bfad94b8f41c0e450f37b9fff5  C406 compositeKey=6784025dbd1b04f5c708e9f7775649ff89ec03dfef34bfad94b8f41c0e450f37b9fff5  C407 compositeKeyHash=4900b7db35741f5cb7f6eb1ea3c708cf7ac4e09e  C408 combinedInput=6dd3b9a74b883a87596e3dfe495bc23b334425214%201234%206784025db  C409
d1b04f5c708e9f7775649ff89ec03dfef34bfad94b8f41c0e450f37b9fff5 https://webbtc.com/script/6dd3b9a74b883a87596e3dfe495bc23b334425214%201234%20  C410
6784025dbd1b04f5c708e9f7775649ff89ec03dfef34bfad94b8f41c0e450f37b9fff5%20a9144
900b7db35741f5cb7f6eb1ea3c708cf7ac4e09e88a914c9440a6ff7e66be6ce4a3524a7c44f2
92a63153388a914aa5e8c44612ea01b64f65b597bfbe3f670ff7ed487/OP_HASH160%2099
40cf61d906e99020d685cb6b836953a12c5e29%20OP_EQUAL

FIG-4C

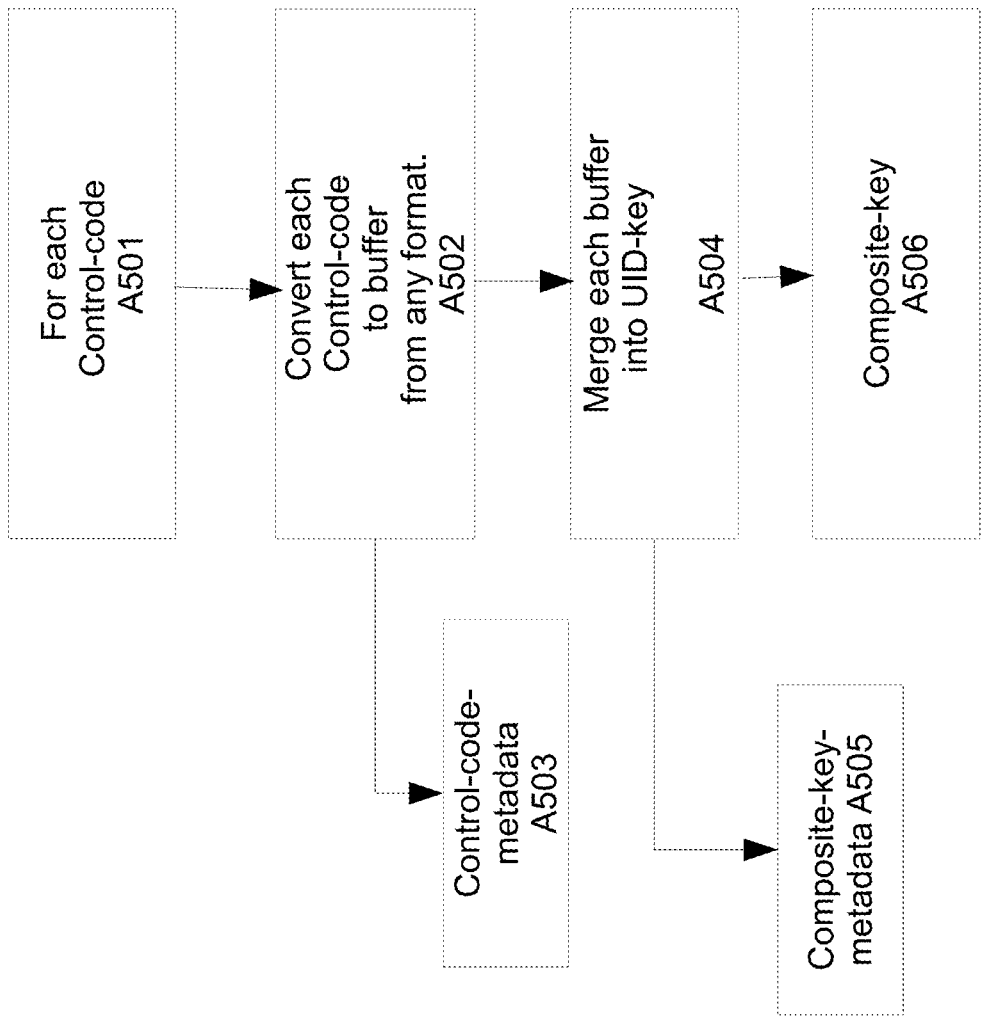

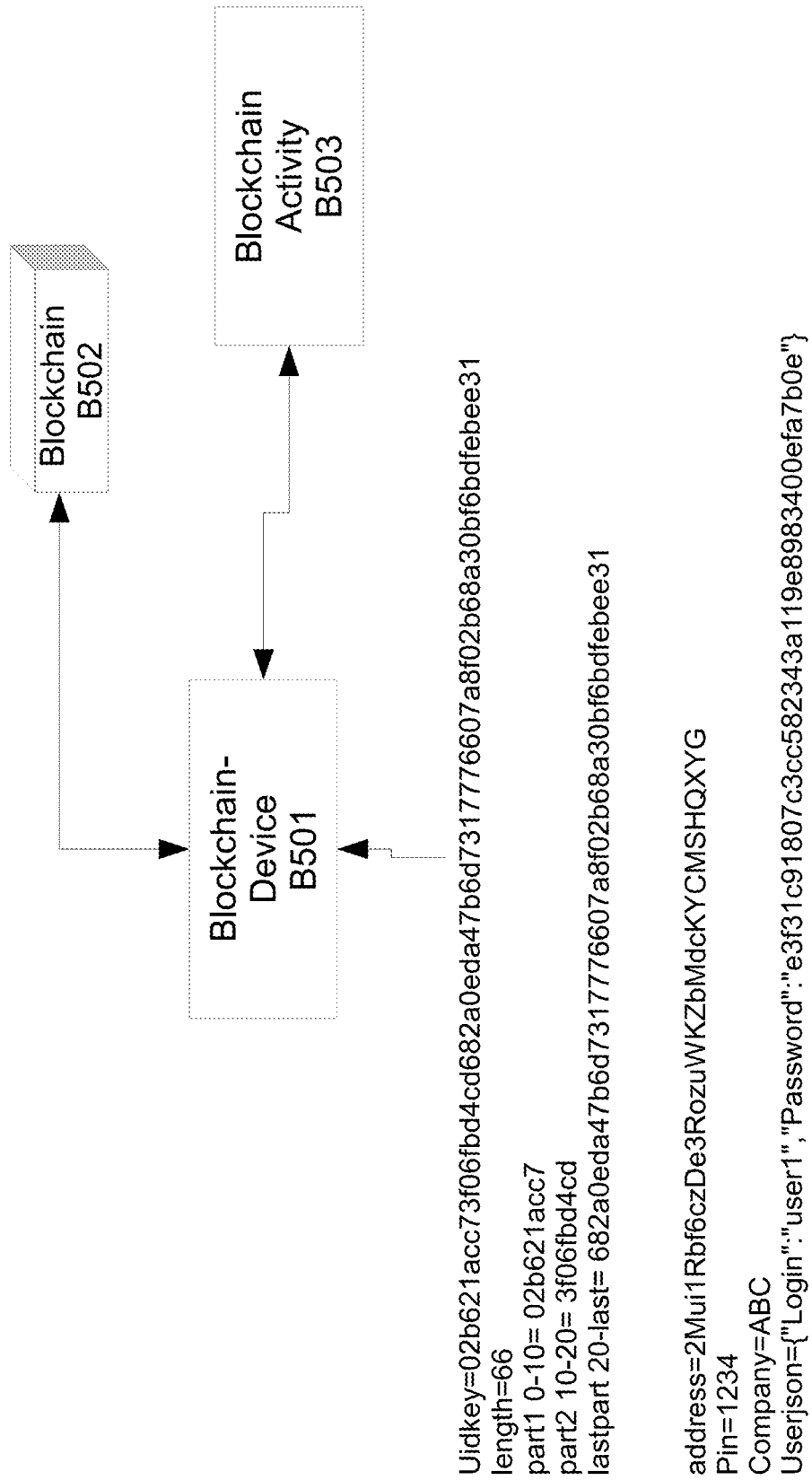

Examples of metadata

A601
```
Pin=' '
Company=' '
Userjson={"Login":" ",
          "Password":" "
}
```

A602
```
Metadata-userjson =
{
type: 'json'
process:'stringify',
buffering: 'Buffer',
fields : [{name:'Login'}, {name:'Password'}],
transformation: [{},
  {type_of_hash:'hash160',
   number_of_times: 2,
   presented_as: 'hex'
  }]
}
```

A603
```
Metadata-company =
{
type: 'text'
process:'none',
buffering: 'Buffer',
type_of_hash:'none',
number_of_times: 0,
presented_as: 'text'
}
```

A604
```
Metadata-pin =
{
type: 'text'
process:'none',
buffering: 'Buffer',
type_of_hash:'none',
number_of_times: 0,
presented_as: 'text'
}
```

A606
```
Metadata-composite-key =
{
uidkey_length: 66,
parts: 3,
partsdesc: [
 {name: 'part1',start: 0, end:10}
 {name: 'part2',start:10, end:20}
 {name: 'part3',start: 20, end:' '}
],
Sequence: [
 'part1',
 'userjson',
 'pin',
 'part3',
 'company'
]
encryption: 'none',
typeof_encryption: 'none'
}
```

FIG-6A

Example of data for execution

B601
Uidkey=02b621acc73f06fbd4cd682a0eda47b6d7317776607a8f02b68a30bf6bdfebee31
length=66
part1 0-10= 02b621acc7
part2 10-20= 3f06fbd4cd
lastpart 20-last= 682a0eda47b6d7317776607a8f02b68a30bf6bdfebee31

B602
address=2Mui1Rbf6czDe3RozuWKZbMdcKYCMSHQXYG
Pin=1234
Company=ABC
Userjson={"Login":"user1","Password":"e3f31c91807c3cc582343a119e8983400efa7b0e"}

B603
rebuilt-compositekey= 02b621acc77b224c6f67696e223a227573657231222c2250617373
776f7264223a22653366333163393138303763333433613131396538393833343030656661376230
65227d3f06fbd4cd1234682a0eda47b6d7317776607a8f02b68a30bf6bdfebee31414243

B604
redeemScript=a9144a6ed75b9d255fbefc688482cedbdebfb7a65a3c87

B605
https://webbtc.com/script/02b621acc77b224c6f67696e223a227573657231222c2250617373
776f7264223a22653366333163393138303763333433613131396538393833343030
65666137623065227d3f06fbd4cd1234682a0eda47b6d7317776607a8f02b68a30bf6bdfebee3141
4243%20a9144a6ed75b9d255fbefc688482cedbdebfb7a65a3c87/OP_HASH160%201b00feb96ab25
e224d830a89d10b0341f24e1f4d%20OP_EQUAL

FIG-6B

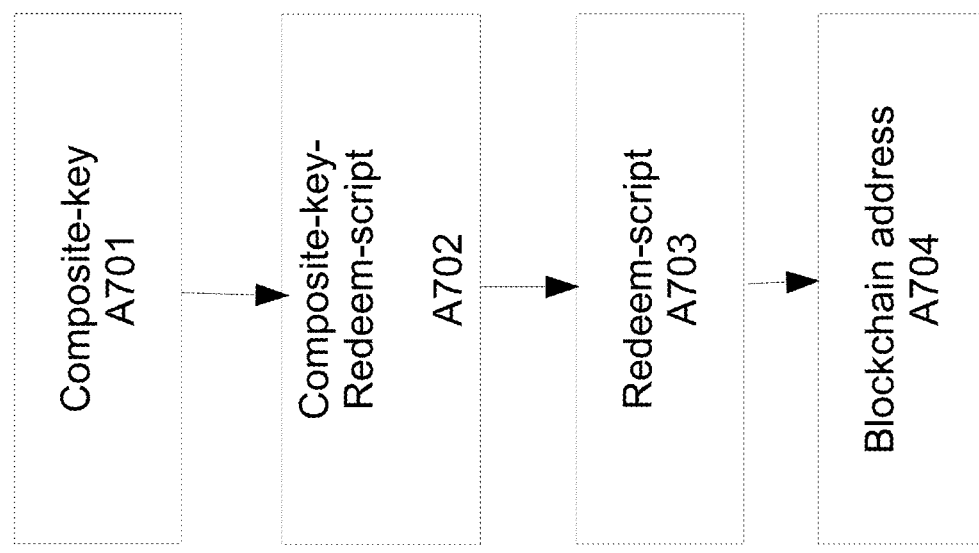

FIG-7B

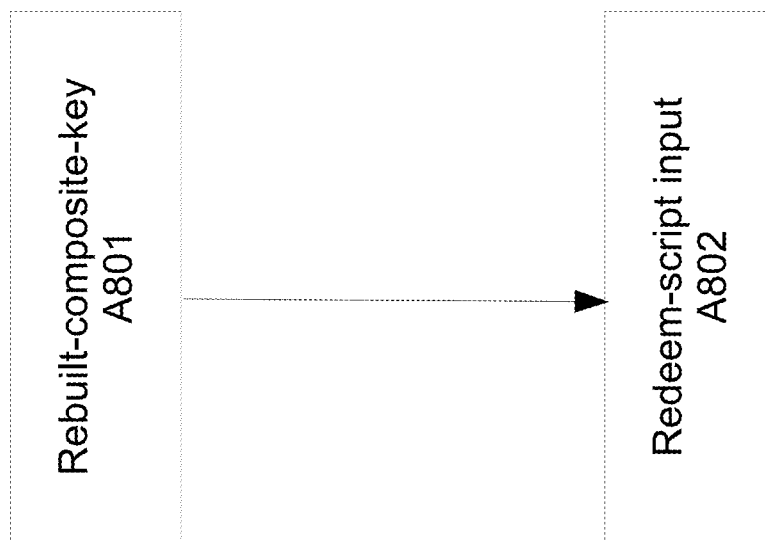

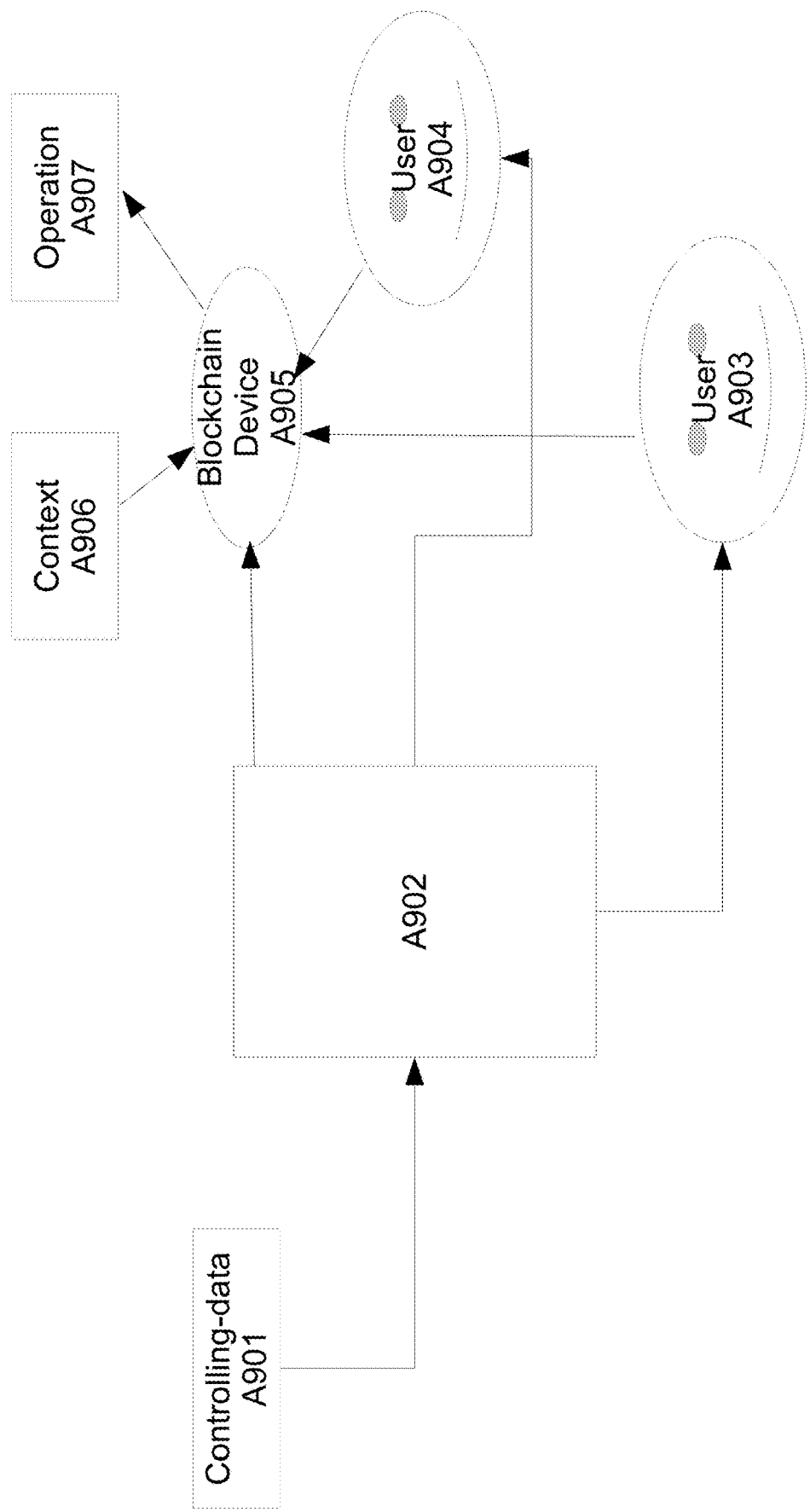

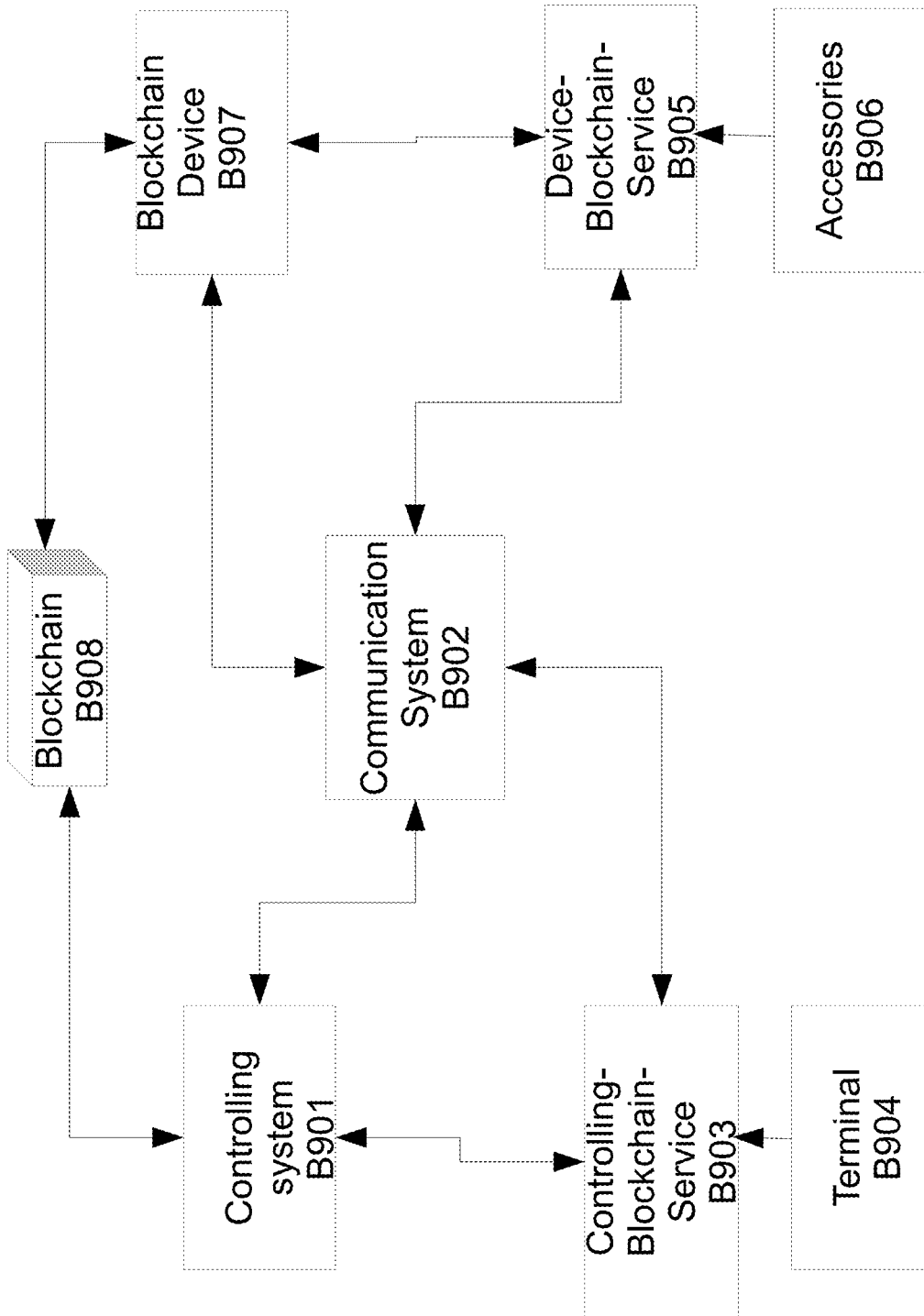

SYSTEM AND METHOD FOR COMPOSITE-KEY BASED BLOCKCHAIN DEVICE CONTROL

TECHNICAL FIELD

The present disclosure relates to the system for controlling blockchain-device, consisting of controlling-system, communication-system, and blockchain-device.

Moreover, the present disclosure relates to methods of controlling blockchain-device, consisting of controlling-system, communication-system, and blockchain-device.

Furthermore, the present disclosure relates to computer program products comprising non-transitory computer-readable storage media having computer-readable instructions stored thereon, the computer-readable instructions being executable by a computing system comprising processing hardware to execute methods described.

REFERENCES CITED

U.S. Pat. No. 4,995,082, describes efficient short signatures generation.

US patent application WO2017187395A1 describes a system for controlling the performance of a contract.

US patent application 2016/0283920A1 describes a system for storing a hash of digital evidence in the blockchain.

U.S. Pat. No. 9,849,364B2 describes a system for ethereum blockchain based IOT device control.

US patent application US 2016/0283941A1 describes a mechanism for using P2SH for personal identification and verification.

Publication number WO2017187396A1 shows an example of implementing logic gates functionality using blockchain.

BACKGROUND OF THE DISCLOSURE

The blockchain is the underlying technology of bitcoin system. Bitcoin is the first cryptographic-based electronic money, which was invented in 2008. Bitcoin is a decentralized peer-to-peer transaction network for recording and verifying the bitcoin transactions. The units that record and verify the bitcoin transactions are called miners. The miners maintain ledgers of all transaction in the blockchain.

In this document the term "blockchain" to include all forms of electronic, computer-based, distributed ledgers. These include consensus-based blockchain, mining-based technologies, permissioned and un-permissioned ledgers, side chain and alt chain technologies, shared ledgers and variations thereof. The most widely known application of blockchain technology is the bitcoin ledger, although many other blockchain implementations are developed. While bitcoin may be referred to herein for the purpose of convenience and illustration, it should be noted that the disclosure is not limited to use with the bitcoin blockchain and alternative blockchain implementations and protocols fall within the scope of the present disclosure.

A blockchain is implemented in a computer-based decentralized, distributed system made up of blocks which in turn are made up of transactions. Each transaction is a data structure that encodes the transfer of control of digital assets between participants in the blockchain system. It includes at least one input and at least one output. Each block contains a hash of the previous block to that blocks become chained together to create a permanent, unalterable record of all transactions which have been written to the blockchain since its inception.

Typical transaction output looks like below, wherein "Input" represents the person who has spent, by signing (as in scriptSig). The "Output" represents the person who has received, in this case the owner of scriptPubKey (ie. The bitcoin address of receiver)

```
Input:
Previous tx: f5d8ee39a430901c91a5917b9f2dc19d6d1a0e9cea205b009
ca73dd04470b9a6
Index: 0
scriptSig:
304502206e21798a42fae0e854281abd38bacd1aeed3ee3738d9e14466
18c4571d10
90db022100e2ac980643b0b82c0e88ffdfec6b64e3e6ba35e7ba5fdd7d5d
6cc8d25c6b241501
Output:
Value: 5000000000
scriptPubKey: OP_DUP OP_HASH160 404371705fa9b
d789a2fcd52d2c580b65d35549d
OP_EQUALVERIFY OP_CHECKSIG
```

The small programs in transactions (like scriptPubKey) known as scripts embedded into their inputs and outputs specify how and by whom the outputs of the transactions can be accessed.

On the bitcoin platform, these scripts are written using a stack-based scripting language. In order for a transaction to be written to the blockchain, it must be 'validated'. Network nodes (miners) perform work to ensure that each transaction is valid, with invalid transactions being rejected by the network.

Typically in bitcoin blockchain technology the transacting entity which can be called a user, is identified by a public-key or a user having a secret. In the case of transacting entity identified by public-key, it is called P2PKH method, The other method of the user having a secret is called the P2SH method.

In the P2PKH method, the holder of the public-key needs to provide public-key and signature to withdraw from blockchain address. This is then validated by the miner or consensus provider. The miners verify the user by checking the hash of public-key user has provided and also the signature of the public-key holder. This method of checking is called P2PKH method (pay-to-public-key-hash) in bitcoin system.

In the P2PKH method, the public-key, private-key is created from Elliptic Curve Digital Signature Algorithm (ECDSA).

In the P2SH method, the users are identified by, the user having redeem-script and also having input for redeem-script. In this method, the bitcoin users will provide the redeem-script-input and redeem-script to spend the bitcoin. In this method, the miners will verify if the hash of the redeem-script matches with the hash stored in bitcoin address. Then it processes the redeem-script-input following the redeem-script. This method of checking is called P2SH (pay-to-script-hash) in bitcoin system.

In the P2SH and P2PKH method, the scripts use bitcoin Opcodes, these Opcodes are bitcoin instructions like OP_IF, OP_DUP etc. These Opcodes instruct the miners, how the data has to be processed.

The P2SH and P2PKH scripts are considered standard-scripts in bitcoin system.

To provide custom features, developers use custom Opcodes to achieve the custom outcome. Such scripts are considered non-standard-scripts. They are also called bitcoin custom-contracts or bitcoin smart contracts.

The bitcoin custom-contracts, typically use P2SH method, where the redeem-script has the custom-contract. The custom-contract may contain non-standard Opcodes. When the redeem-script has non-standard Opcodes, the bitcoin miners may refuse to mine the non-standard Opcodes as it is expensive and risky to avoid bugs in custom-contracts.

Because of this, there is less support to bitcoin custom-contracts by miners. Hence the bitcoin custom-contracts are not very popular.

In the P2SH method, the popular redeem-scripts are P2PKH script and multi-signature script. When P2PKH script is used as redeem-script, the spender will provide the signature and his public-key to spend. When the multi-signature script is used as redeem-script, spender will provide signatures of multi-signature participants.

Typical P2SH uses following pattern
scriptPubKey: OP_HASH160<scriptHash>OP_EQUAL
scriptSig: <input to script><serialized script>
where <input to script> is input to serialized script.
Typical P2PKH uses following pattern
scriptPubKey: OP_DUP OP_HASH160<pubKeyHash> OP_EQUALVERIFY
OP_CHECKSIG
scriptSig: <sig><pubKey>
Typical Multi-signature uses following pattern
scriptPubKey: OP_HASH160<scriptHash>OP_EQUAL
scriptSig: . . . signatures . . . <serialized script>
m-of-n multi-signature transaction:
scriptSig: 0<sig1> . . . <script>
script: OP_m<pubKey1> . . . OP_n OP_CHECKMULTISIG To overcome limitation of bitcoin custom-contracts, other blockchain solutions evolved. The popular alternatives are Ethereum and Hyperledger. In these systems, the custom-contract scripts are written in high level languages like Solidity, Go, Java. These are then installed in blockchain. These are then executed by users to get desired results.

The present disclosure is an improvement to standard usage of P2SH redeem-script mechanism, due to which dependency of signature for every transaction is removed. Instead of that, a UID-key is used to identify the blockchain device and a secret (like a PIN) delivered by SMS on mobile or similar methods can be used to perform the transaction. Thus resulting in the easier creation of bitcoin custom-contracts. Where ever bitcoin custom-contracts are used they can be decoupled from the dependency signature in some situations to perform the transaction.

This should help more acceptance of bitcoin custom-contracts in applications to control blockchain-devices.

Another prevalent method is the use of OP_RETURN based solutions. In this method, they use OP_RETURN to implement solutions. By using OP_RETURN mechanism 40 bytes of data is stored in the blockchain. This 40 byte is used intelligently to implement some solutions like asset-management, document-signing, document-verification. However, this method of bitcoin solutions solves different problems. So it is not related to present disclosure. The OP_RETURN based implementation is used in colored coins, and multichain.

The present disclosure can also be called the script-less script as it achieves functionalities that typically requires complex scripts without actually using complex scripts.

U.S. Pat. No. 4,995,082 describes efficient short signatures generation mechanism. This is popularly called shnorr technique. It is described in some articles on script-less scripts in bitcoin. This mechanism is different and used for solving different problems.

US patent application WO2017187395A1 describes a system for controlling the performance of a contract using a distributed hash table and a peer-to-peer distributed ledger. This uses regular way of using P2SH to ensure license is controlled through blockchain.

US patent application WO2017187396A1 shows a mechanism for implementing logic gates using blockchain. However, this uses the traditional way of using P2SH. The present disclosure uses different mechanism compared to this prior art.

US patent application US 2016/0283920 A1 stores hash of evidence in the blockchain. This is used for detecting tampering. This is solving a different problem. The disclosed method is different from this method.

U.S. Pat. No. 9,849,364 B2 uses ethereum blockchain to control devices. Using disclosed methods similar control can be achieved using bitcoin blockchain.

US patent application 2016/0283941 A1 describes a mechanism for using P2SH for personal identification and verification. The disclosed method is different from this method.

Briefly, the following problems are not easily implementable using existing bitcoin standard-scripts usage mechanisms:
  Multi-user approvals, using traditional login/password or one-time passwords.
  Remote locking/unlocking devices through blockchain.
  Location-based triggering of activities through blockchain.
  Multi-user document signing, using traditional login, OTP.
  Easily redeemable coupons issued on the blockchain.

The feasibility of disclosed methods has been tested using bitcoinjs-lib library version 2.3. The confirmation of working feasibility is done in a debug environment. The screenshots and examples are provided. However, these examples depend on other environments needed to execute them.

The examples provided are for demonstration of few methods. However, its usage is not limited to only those methods.

Below is some privacy-related observation of P2SH.

In the P2SH method, the input to redeem-script is private until the transaction is executed. However, after the transaction is executed it is visible in the raw data of the transaction to the public. This prevents multiple transactions happening between two users in blockchain using the disclosed method. This is a limitation of this method.

To allow for multiple transactions between two users, overcoming above limitation, a method of coupling controlling-system and blockchain-device is provided.

To allow same blockchain address to be used multiple times a method is provided to build dependency signature for blockchain transaction with disclosed methods.

Also to prevent exposure of data in public records, the hash of control-codes can be used in redeem-script-input.

SUMMARY

In many modern day technologies, the use of remote control of devices is common. This is normally achieved by controlling devices via electronic circuits connected via wired or wireless networks. In some applications, remote control of devices is achieved via the internet.

In the present disclosure, a mechanism to control such devices via blockchain is described.

With the evolution of bitcoin blockchain, there was a requirement to control remote devices via blockchain. This was not possible using known way of using bitcoin blockchain scripts. Hence a new technique is designed to provide the ability to control blockchain-device through blockchain.

In the bitcoin blockchain environment, normally the blockchain-devices are identified by a public-key. The blockchain-device signs using private-key of corresponding public-key to withdraw, the value in the blockchain.

In the present disclosure alternate way of identification of blockchain-device is provided using unique identification-key (UID-key). Using this UID-key the control to spend value in blockchain address is enforced.

In the disclosure, one or more methods are provided to achieve traditional controls like OTP, user-id, password in a bitcoin blockchain system.

Some of the solutions possible using this method is listed below.

- Multi-user approvals, using traditional login/password or one-time passwords.
- Remote locking/unlocking devices through blockchain.
- Location-based triggering of activities through blockchain.
- Multi-user document signing using traditional login, OTP.
- Easily redeemable coupons can be issued on the blockchain.

The disclosure shows the architecture of various participants in the system comprising the controlling-system, communication-system, blockchain-device. The controlling-system that creates one or more controlling data to control one or more blockchain-devices, based on one or more control-codes. The controlling-system then interacting with one or more blockchain-devices, accessories (users and devices) connected to blockchain-devices through communication-system.

The present disclosure may describe one or more methods to create composite-key to be used with the P2SH method to achieve control over blockchain-devices.

The method may comprise steps to create a unique identification-key (UID-key) for blockchain-device activity.

The method may describe a technique for merging UID-key and one or more control-codes.

The method may describe steps for creating redeem-script from composite-key.

The method may comprise, a technique for redeeming value in the blockchain, wherein the composite-key is rebuilt by the blockchain-device using data available from accessories connected to blockchain-device.

The method may comprise steps to convert one or more control-codes in one or more data formats like integer, string, array, JSON to a buffer.

The method may comprise steps of merging at least one buffer of control-codes into UID-key buffer in any position between 0 to end of the buffer, inclusive of both ends of UID-key to create composite-key.

The method may comprise of steps for hashing one or more control-codes, one or more times, then merge at least one buffer of control-code into the UID-key buffer in any position between 0 to end of the buffer, inclusive of both ends of UID-key to create composite-key.

The method may comprise of steps of hashing complete buffer of control-codes, one or more times, then merge at least one buffer of control-code into the UID-key buffer in any position between 0 to end of the buffer, inclusive of both ends of UID-key to create composite-key.

The method may comprise steps for converting composite-key to redeem-script, wherein the hash of composite-key is stored in redeem-script.

The method may comprise steps for converting redeem-script to P2SH address, wherein the hash of redeem-script is stored in P2SH address.

The method may comprise of steps for identifying one or more control-codes, controlling-data that need to be sent through one or more communication channels in communication-system to blockchain-device.

The method may comprise of steps for identifying one or more control-codes, controlling-data that need to be sent through one or more communication channels of communication-system to one or more accessories connected to blockchain-device.

The method may comprise of steps for reading one or more control-codes, controlling-data received through one or more communication channels in communication-system. Then configuring the blockchain-device using metadata, received through communication-system from one or more accessories connected to blockchain-device.

The method may comprise of steps for validating the correctness of one or more control-codes, controlling-data received through one or more communication channels in communication-system. Then displaying the result to one or more users connected to blockchain-device to get instruction or commands to perform at least one operation.

The method may comprise steps for building redeem-script-input (rebuilt-composite-key) using one or more control-codes, to execute one or more transactions. Then communicating the result to one or more accessories connected to blockchain-device, to instruct them to perform one or more activities.

The method may comprise of steps for verifying one or more past transaction on the applicable P2SH address, then perform one or more activities.

The method may comprise steps for blockchain-device operation, which may by verifying data or checking one past data or performing one transaction.

The method may comprise of steps to activating blockchain-device activity based on the value of blockchain address or state of blockchain address.

The method may comprise of steps to performing blockchain-device activity based on the trigger by value in blockchain address or state of blockchain address.

The method may comprise steps for adding one or more smart contracts to extend the functionality of disclosed methods. The method may comprise of steps for getting inputs for one or more smart contracts along with composite-key to execute the blockchain-device transaction.

The method may comprise steps to configure blockchain-device for one or more activity, connected to one or more blockchain addresses.

The method may describe technique for execution of one or more blockchain-device activity, wherein the type of activity may be financial activity, asset activity, device activity, movement activity, game activity, wherein the performed activity may be to lock, unlock, start, stop, create, delete, update, remove, empty, add, transfer, issue etc depending on type of activity.

Any feature described in relation to one aspect or embodiment may also be used in relation to another aspect or embodiment. For example, any feature describes in relation to the method may be applicable to the system and vice versa.

These and other aspects of the present disclosure will be apparent from and elucidated with reference to, the embodiment described herein. An embodiment of the present disclosure will now be described, by way of examples and accompanying drawings.

The disclosure describes computer program product comprising a non-transitory computer-readable storage medium having computer-readable instructions stored thereon, the computer readable instructions being executable by a computing system comprising processing hardware to execute methods described.

A BRIEF DESCRIPTION OF DRAWINGS

Figure 8B:
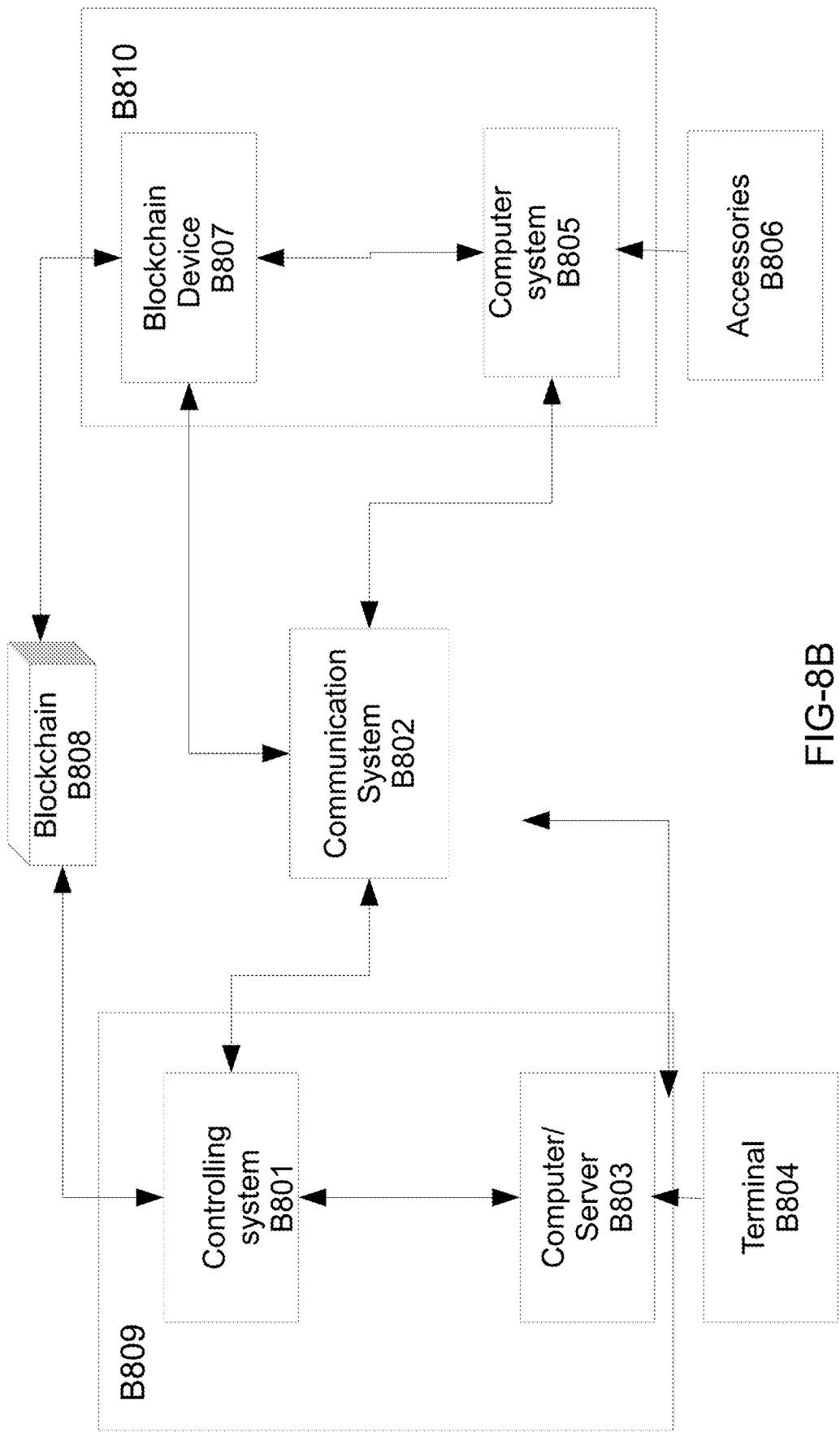

FIG. 1A: Architecture of the solution
FIG. 2A: Example of control codes to be merged at location 10, 20 and end of UID-key
FIG. 3A: Example of composite-key creation
FIG. 4A: Example output of composite-key and redeem-script
FIG. 5A: Flowchart to create composite-key
FIG. 6A: Examples of metadata
FIG. 7A: Flowchart to create blockchain address
FIG. 8A: Rebuilt-composite-key used as redeem-script-input
FIG. 9A: The Communication system
FIG. 1B: Flowchart of Blockchain-device
FIG. 2B: Flowchart of blockchain-device operation
FIG. 3B: Prior-art P2SH and standard redeemScript
FIG. 4B: P2SH and disclosure redeemScript
FIG. 5B: Example of data taken by Blockchain-device for execution
FIG. 6B: Example of data for execution
FIG. 7B: Example of execution using Rebuilt-composite-key
FIG. 8B: System architecture of the solution
FIG. 9B: Service architecture of the solution
FIG. 1C: Simple use case of solution
FIG. 2C: Steps for using custom-contract
FIG. 3C: Javascript example of using custom-contract
FIG. 4C: Example of the transaction with custom-contract
FIG. 5C: Example of execution using custom-contract

DESCRIPTION

This disclosure is an improvement for existing methods of using redeem-script in blockchain systems, wherein the improvement is the introduction of control-codes with unique identification-key for each blockchain-device activity. Thus resulting in the ability to control the plurality of blockchain-devices easily.

The systems and methods described help blockchain devices to be controlled using simple techniques, which otherwise would require complex custom-scripts. Thus resulting in many new types of usages of the blockchain.

The systems and methods in the disclosures are classified as "controlling system", "communication system", and "blockchain device".

The architecture of these systems and methods is shown in FIG. 1A.

There are certain terms and phrases used in this disclosure to help describe the systems and methods. They are explained below.

Terms and Phrases Used

Controlling system: It is a hardware and software used to create controlling-data. It is also referred to as controlling-system or controlling system.

Controlling-data: This represents the collection of data comprising of control-codes, redeem-script, blockchain address, metadata. It is also referred to as controlling-data or controlling data.

Custom-contract: It is contract using bitcoin opcodes trying to provide custom functionality. This takes custom-input as input.

Custom-input: It is a contract input for custom-contract.

Smart contract: This refers to custom-contract in bitcoin context. It is used to provide custom features, not available in standard-scripts.

Smart contract input: This is input to smart contract. It also refers to custom-input.

Unique identification key (UID-key): This is a unique identification key, created to identify each activity of blockchain device.

Redeem-script: This is the script used for processing P2SH-address redemption. It is referred to as redeemScript or redeem-script in some places.

Control code: It is a code that represents some controlling instruction on blockchain-device. It is also referred to as control-code or Control-code in some places.

Composite-key: It is a constructed data by merging control-codes into UID-key. It is also referred to as composite-key.

Rebuilt-Composite-key: It is a composite-key built by blockchain-device. This is also referred to as rebuilt-composite-key.

Composite-key-redeem-script: This is the redeem-script that is used to redeem composite-key. It is also referred to as composite-key-redeem-script.

Redeem-script-input: This is the input to redeem-script. It is also referred to as redeem-script-input.

Metadata: It is the helper data that is created by controlling-system for blockchain-device, to assist in organizing inputs at blockchain-device. Metadata here refers to both composite-key-metadata and control-code-metadata.

Composite-key-metadata: This is the metadata corresponding to the composite-key organization. This is also referred to as composite-key-metadata.

Control-code-metadata: This is the metadata corresponding to the control-code organization. This is also referred to as control-code-metadata.

Contract-input-metadata: This is the metadata describing the contract-input.

Blockchain device: This is the device connected to the blockchain, that performs blockchain operation, based on data in blockchain address. This is also referred to as Blockchain-device or blockchain-device in some places.

Blockchain accessories: These are devices connected to blockchain-device.

Blockchain address: The blockchain address here refers to the P2SH address in the bitcoin context unless mentioned otherwise. This is also referred to as blockchain-address, blockchain address in some places.

Standard-scripts: These are bitcoin scripts that are recognized as safe, and normally used by the majority of bitcoin users.

Custom-scripts: These are bitcoin scripts, that are not considered as standard scripts by the community of bitcoin users.

Transaction output: This refers to input/output data of blockchain transaction when referred in the context of bitcoin.

P2SH address: This is the blockchain address (bitcoin address) created from redeem-script using the P2SH method.

UID-key: It refers to Unique identification key, created for each blockchain-device activity. It is also referred to as Uidkey in some places.

Keypair: Public key, the Private key generated from Elliptic Curve Digital Signature Algorithm(ECDSA).

QR-code: These are the two-dimensional barcode, used for communicating data through printed labels, cards, papers, mobile apps.

Communication system: This is the communication link between controlling-system and blockchain-device. This is also referred to as communication-system.

Device-blockchain-service: This is the service to integrate blockchain-device with controlling-system and accessories. It is also referred to as device-blockchain-service.

Controlling-blockchain-service: This is the service to provide blockchain-device controlling service. It is also referred to as controlling-blockchain-service.

In the examples provided in disclosure, javascript library of bitcoin that comes with bitcoinjs-lib version 2.3 is used to demonstrate the functionality. The working feasibility is tested in debug environment. The screenshots and examples are provided.

The said examples are provided to demonstrate certain features, in certain ways. These should not be considered as a limitation of usage of disclosed methods in other environments or in other forms of usage.

Index of Disclosed Methods and Systems
1.0 Architecture of solution
2.0 Controlling system
  Controlling system input processing
  Step creating UID-key for blockchain-device
  Step creating the buffer of control-codes from control-codes
  Step creating composite-key from control-codes
  Step creating redeem-script from composite-key
  Step creating P2SH address from redeem-script
  The controlling-data for blockchain-device
  The controlling-data for blockchain-device accessories
  The control-code normalization
  Storing blockchain-device controlling-data for future use
  Providing controlling-data as a service.
  Activation based on value, state of blockchain address.
  Using one or more smart contracts
  Using smart contract with signature verification in redeem-script
  Controlling various type of blockchain devices
  Coupling controlling system logic with blockchain-device
3.0 Communication system
  Connecting multiple accessories connected to blockchain-device
  Sending part of controlling-data in a different channel
  Receiving and transforming controlling-data
  Sending controlling-data to blockchain-devices
4.0 The Blockchain-device
  Blockchain-device reading and initializing
  Blockchain-device configuring
  Blockchain-device input
  Blockchain-device listening and performing an operation
  Blockchain-device performing activity
  Blockchain-device taking input from accessories
  Blockchain-device rebuilding composite-key (rebuilt-composite-key)
  Blockchain-device using rebuilt-composite-key as redeem-script-input
  The blockchain-device verifying correctness of rebuilt-composite-key
  Blockchain-device checking past transaction using rebuilt-composite-key
  Blockchain-device data normalization
  Blockchain-device configured for multiple activities
  Blockchain-device activation based on value, state of blockchain address
  Blockchain-device accepting one or more smart contracts inputs
  Blockchain-device using a signature in smart contract input
  Various type of Blockchain-devices
  Coupled blockchain-device
5.0 Computer program product for controlling blockchain-device
6.0 Blockchain-service for controlling blockchain-device
7.0 USE CASES
  USE CASE: Device execution by a user at specific GPS location
  USE CASE: Drone unlocking at specified GPS location
  USE CASE: Money transfer/Coupon transfer
  USE CASE: Document signing with multiple conditions
  1USE CASE: Multi-user validation
1.0 Architecture of Solution FIG. 1A shows the architecture of the solution described in the disclosure. A101 is the block for the creation of one or more set of controlling-data. The input for A101 may come from computer, service, terminal, devices. These inputs are called control-codes. The control-codes are processed as shown in flowchart FIG. 5A. The block A101 also creates a unique identification-key (UID-key) which is a buffer of random data.

The UID-key along with control-codes are processed to create one or more set of controlling-data which comprises composite-key, redeem-script, P2SH address, composite-key-metadata, control-code-metadata. These are explained in FIG. 2A (the example of control-codes), FIG. 3A (composite-key creation example), FIG. 5A (flowchart for composite-key), FIG. 7A (flowchart to create blockchain address).

The one or more set of controlling-data created, is made available to communication-system A102. Some of the controlling-data may be stored in database or server A103. The communication system will make available controlling-data in different channels of communication to blockchain-devices. Some part of these data may also be made available to accessories connected to blockchain-devices. This is further shown in FIG. 9A.

The blockchain-device A105 is connected to one or more channels of communication-system to receive one or more set of controlling-data, control-codes. The blockchain-device has the necessary software, interfaces to interact with accessories. It also has software to interact with blockchain. The architecture of communication-system connecting to blockchain-device is shown in FIG. 9A. Flowchart of blockchain-device functioning is shown in FIG. 1B.

2.0 Controlling System
Controlling System Input Processing

The controlling system A101 may take one or more control-codes as input, to control one or more blockchain-devices. This data can be in any data format like integer, string, array, JSON etc. This data can also be loaded from files, servers, databases, entered through terminals. It may be related to some data the user of blockchain-device is aware or may be related to some data of accessories connected to blockchain-device. The control-codes are converted to buffer of control-codes for further processing. The javascript example to process control-codes is shown in FIG. 3A.

Step Creating UID-Key for Blockchain-Device

In the controlling system, the UID-key is created. It is generally a unique random key, which identifies a blockchain-device activity. In some other type of design, the UID-key may be provided from blockchain-device to the controlling system.

In the example, FIG. 3A, provided, the bitcoin random public-key generation function is used to create UID-key in line A301. However other random key generation techniques can also be used.

This UID-key is converted into a buffer for further processing. In this example the UID-key created is already in buffer format. So no transformation is seen for UID-key A301 in the example shown in FIG. 3A.

Step Creating the Buffer of Control-Codes from Control-Codes

The control-codes can be in any format like string, integer, array, JSON etc. These are converted into buffer format. After conversion, the control-codes may be concatenated to create another buffer of control-codes. The metadata for control-codes is accordingly created or updated.

One or more control-codes in JSON format may be converted into the buffer by first stringifying the JSON data and then converting to buffer format. In the example the order of JSON format data is expected to be same always. In the other embodiments, if order is likely to change, the JSON data can be converted into a array of name, value pair before using. The metadata for control-code is created or updated accordingly.

In the example in FIG. 3A, in line A313 JSON data variable "Userjson" can be seen stringified in line A315 and then converting to buffer in line A316.

The metadata created for the example for "Userjson" can be seen in FIG. 6A A602. In this example, metadata is shown in JSON format. However, in other embodiments, the metadata can be in other formats.

In the example in FIG. 3A, javascript function Buffer.from( ) is used to convert string "ABC" to buffer A308. For JSON data, the javascript function JSON.stringify( ) is used to convert JSON to string A315, and then using function Buffer.from( ) to create buffer.

In other embodiments, other methods of converting data to buffer formats may be used.

In other embodiments, other methods of conversion of digital data may be needed to convert them to buffer format.

In other embodiments, some JSON data may be hashed one or more times and used in the creation of the buffer for control-codes.

In other embodiments, some control-codes may be hashed one or more times and used in the creation of the buffer for control-codes.

In the example in FIG. 3A, the password is hashed two times in line A311, A312 to create variable "passwordhashhash". Then the variable "passwordhashhash" is used in line A314.

In other embodiments, the complete stringified data of JSON control-code or complete control-code data may be hashed one or more times and used in the creation of buffer of control-codes.

Step Creating Composite-Key from Control-Codes

The flowchart corresponding to above process of conversion is shown in FIG. 5A.

For each of the control-code A501, specific encoding or hashing is done as needed. Once the encoding or hashing is done, it is converted into the buffer of control-code A502. It also creates control-code-metadata A503. The example of metadata is seen in FIG. 6A, A602, A603, A604. The control-code-metadata contains information of how control-code was processed while creating the buffer of control-codes.

The buffer of that control-code A502 is merged into the buffer of UID-key at any position between 0 and end of UID-key. One or more buffers of control-codes A502 can be merged into UID-key. It is also possible to hash each of the control-code buffers and create another buffer of hashed control-codes before merging into UID-key. These merging functions are done in A504. The output of the block A504 after merging is composite-key A506. Details about merging are updated in composite-key-metadata A505. The example of this is shown in FIG. 6A, A606.

The composite-key-metadata A505 contains information about the type of hashing done to control-code buffers and where it is merged into the UID-key etc.

In the example considered to demonstrate this feature in FIG. 2A, it can be seen that in line A208, that a composite-key is planned to be created by merging "Userjson" data after 10th position of "Uidkey", the "Pin" is to be merged after 20th position of "Uidkey", the "Company" is to be merged after end of "Uidkey". Here "Uidkey" is a buffer of unique identification key (UID-key) created in A209. This is further shown in the javascript example in FIG. 3A.

In FIG. 3A, it can be seen "Uidkey" is created in line A301. Then sliced into parts in A302, A303, A304. Then each control-code buffer is created between A305 and A316, Then in line A317, the array of each part to be assembled is created. Then this array is concatenated into the desired composite-key in line A318.

The corresponding metadata updated for this operation is seen in FIG. 6A A606.

Step Creating Redeem-Script from Composite-Key

In FIG. 7A, block A701, A702 the composite-key is used to create composite-key-redeem-script. The composite-key-redeem-script consists of the script to check "hash of composite-key" is correct, wherein the hash of the composite-key is part of the composite-key-redeem-script. This composite-key-redeem-script is also called redeem-script in A703.

In the bitcoin context, the composite-key-redeem-script will consist of "opcode to hash", "hash of composite-key", "opcode the check hash", wherein the "opcode to hash" and the hashing algorithm used for hashing composite-key need to be same.

The example of composite-key-redeem-script is shown in FIG. 4B, line B406 (ie) OP_HASH160<compositeKeyHash>OP_EQUAL.

Where the composite-key is got from line B405 after processing various control-codes and UID-key.

The javascript example to create redeemScript using bitcoinjs-lib is shown below:

```
var compositeKeyHash = bitcoin.crypto.hash160(compositekey);
var redeemScript =
bitcoin.script.compile([bitcoin.opcodes.OP_HASH160,
compositeKeyHash,
bitcoin.opcodes.OP_EQUAL])
```

The composite-key-redeem-script has the hash of compositekey and also opcodes(script) to verify the correctness of input to redeem-script.

The composite-key-redeem-script is used as redeem-script in P2SH address creation in A704.

In the example, embodiment bitcoin opcodes are used to demonstrate redeem-script creation. The "opcode to hash" is "OP_HASH160", the function to create "hash of composite-key" is bitcoin.crypto.hash160( ), "opcode the check hash" is OP_EQUAL.

In other embodiments, alternate opcodes may be used to create redeem-script.

In other embodiments, alternate blockchain opcodes may be used to create redeem-script.

In other embodiments, it is possible to add composite-key hash checking as part of other smart contracts.

Step Creating P2SH Address from Redeem-Script

The standard P2SH method to create the P2SH address in bitcoin consists of inserting redeem-script hash in scriptPubKey. Then encoding the scriptPubKey to create address of desired blockchain network. The scriptPubKey for the standard P2SH method is shown in FIG. 3B, line B301.

The javascript example using bitcoinjs-lib libraries to create P2SH address in bitcoin testnet is shown below:

```
var scriptPubKey =
bitcoin.script.scriptHashOutput(bitcoin.crypto.hash160(redeemScript))
var address = bitcoin.address.fromOutputScript(scriptPubKey,
bitcoin.networks.testnet)
```

In the example embodiment bitcoin opcodes and bitcoinjs-lib libraries are used to demonstrate P2SH address creation from redeem-script.

In other embodiments alternate blockchain opcodes, alternate libraries may be used to create the P2SH address.

It may be seen that P2SH address is encoded into the P2SH address of testnet bitcoin network.

However, in other embodiments, different encoding schemes may be used to create address of other networks.

The Controlling-Data for Blockchain-Device

The controlling-data comprises metadata, redeem-script, P2SH address, UID-key, composite-key, control-codes.

In situations where the smart contract is used the controlling-data may comprise of metadata, redeem-script, P2SH address, UID-key, composite-key, contract-input, control-codes.

This controlling-data is made available to blockchain-device through one or more communication channels of communication-system, like printed cards, plastic cards, electronic cards, email, internet, wifi, NFC, Bluetooth, SMS, mobile apps, electronic gadgets, IoT devices, client-server link, server-mobile link, device-device link, sharing of files, sharing of storage media, sharing of files on networks, sharing of data in the cloud etc.

The controlling-data may be stored on servers, virtual machines, files, databases etc. This data may be stored for sending to blockchain-device after some transformations.

The Controlling-Data for Blockchain-Device Accessories

The one or more blockchain-devices may need to get one or more parts of controlling-data from one or more accessories connected to blockchain-device. These blockchain device accessories may be users, valves, switches, mobiles, GPS devices, computers etc. The blockchain-device accessories may be connected to communication-system through different communication channels from printed cards, plastic cards, electronic cards, email, internet, wifi, NFC, Bluetooth, SMS, mobile apps, electronic gadgets, IoT devices, client-server link, server-mobile link, device-device link, sharing of files, sharing of storage media, sharing of files on networks, sharing of data in the cloud etc.

The controlling-data may reach these blockchain device accessories through their communication channels.

The controlling-system may dispatch controlling-data to respective accessories using their corresponding channels.

The Control-Code Normalization

One or more control-codes may depend on variable data. Such control-codes need to be normalized before being used.

Consider an example, where the different discount percentage is to be issued for different price ranges.

Say discount for price ranges are
10% for 1000$-10000$ (range-a)
15% for 100$-1000$ (range-b)
Then by normalization
The users in range 1000$-10000$ will use code "RA".
The users in range 100$-1000$ will use code "RB".
The codes "RA", "RB" will be used to create composite-key to implement the discount feature.

The process of converting variable data to make them useful with the disclosed system is called normalization.

Storing Blockchain-Device Controlling-Data for Future Use.

In many applications like banks, financial institutions, the controlling-data need to be created for future use by clients, devices, systems, services etc.

In such situations, the controlling-data or part of controlling-data is stored on the local server, cloud server, remote server, central server, hard disks, tapes, files, network storages etc.

In many applications like drone control, locking control, the blockchain-device controlling-data has to be supplied to blockchain-device manufacturers to integrate.

Then controlling-data may need to be supplied to the device manufacturers.

In such situations the controlling-data or part of controlling-data is stored on the local server, cloud server, remote server, central server, hard disks, tapes, files, network storages and supplied.

Providing Controlling-Data as a Service.

Providing controlling-data for various industries can be given as a service, wherein, each user of service will provide control-codes and get the controlling-data.

The controlling-data may be then applied to blockchain-devices. The controlling-data may be collected from the services as JSON files, XML files etc.

Such services may be useful for blockchain-device manufacturers.

Activation based on Value, State of Blockchain Address.

The controlling-data associated with blockchain address can be activated as and when a blockchain value is deposited into blockchain address.

There may be applications where a activity is triggered when a particular amount is found in blockchain address. These are triggers based on the value of blockchain address.

A blockchain device activity may be triggered based on the certain state of blockchain address.

The state of blockchain address could be one of the following
  state of blockchain address not having any record in the blockchain
  state of blockchain address having zero value
  state of blockchain address having some value
  state of blockchain address after transacting some value
  state of blockchain address after at least one past transacting Using One or More Smart Contracts Any smart contract (custom-contract) that can work with a smart contract input (custom-input) can be integrated with disclosed methods. This can be done by adding an opcode to verify the output of composite-key-redeem-script and then concatenating the smart contract to redeem-script (composite-key-redeem-script).

An example is shown how to integrate other smart contracts into the disclosed method.

In FIG. 2C, the line C201 shows an example of composite-key-redeem-script.

Assume a smart contract (custom-contract) needs smart contract input (custom-input).

Then in line C203, the composite-key-redeem-script is concatenated to opcode to verify the output of composite-key-redeem-script execution, followed by that <custom-contract> is concatenated.

In FIG. 3C, the composite-key is created with OTP="6784", in line C302.

Then custom-contract is created to take input Pin1, <Pin2>$_{hash}$ (C312, C313, C314), where Pin1="1234", and <Pin2>$_{hash}$=<"mypassword12">$_{hash}$ The custom-contract is shown in C312.

In C316, C317, the composite-key-redeem-script is shown as
[bitcoin.opcodes.OP_HASH160, compositeKeyHash, bitcoin.opcodes.OP_EQUAL]

In C317, the opcode to verify the output of composite-key-redeem-script is shown as [bitcoin.opcodes.OP VERIFY]

In C315, The custom contract added thereon to redeem-script is shown.

In the current embodiment bitcoin opcodes are used to demonstrate the feature, however, in other embodiments, other blockchain opcodes can be used to achieve the same functionality.

In the current embodiment, one set of opcodes are used to demonstrate. However different set of opcodes can be used to achieve similar functionality

Example

In bitcoin system, the below opcodes
[bitcoin.opcodes.OP_EQUAL].concat([bitcoin.opcodes.OP_VERIFY])
can be replaced with
[bitcoin.opcodes.OP_EQUALVERIFY]

The output of example used for custom-contract with disclosed methods is shown in FIG. 4C.

Figure 5C:
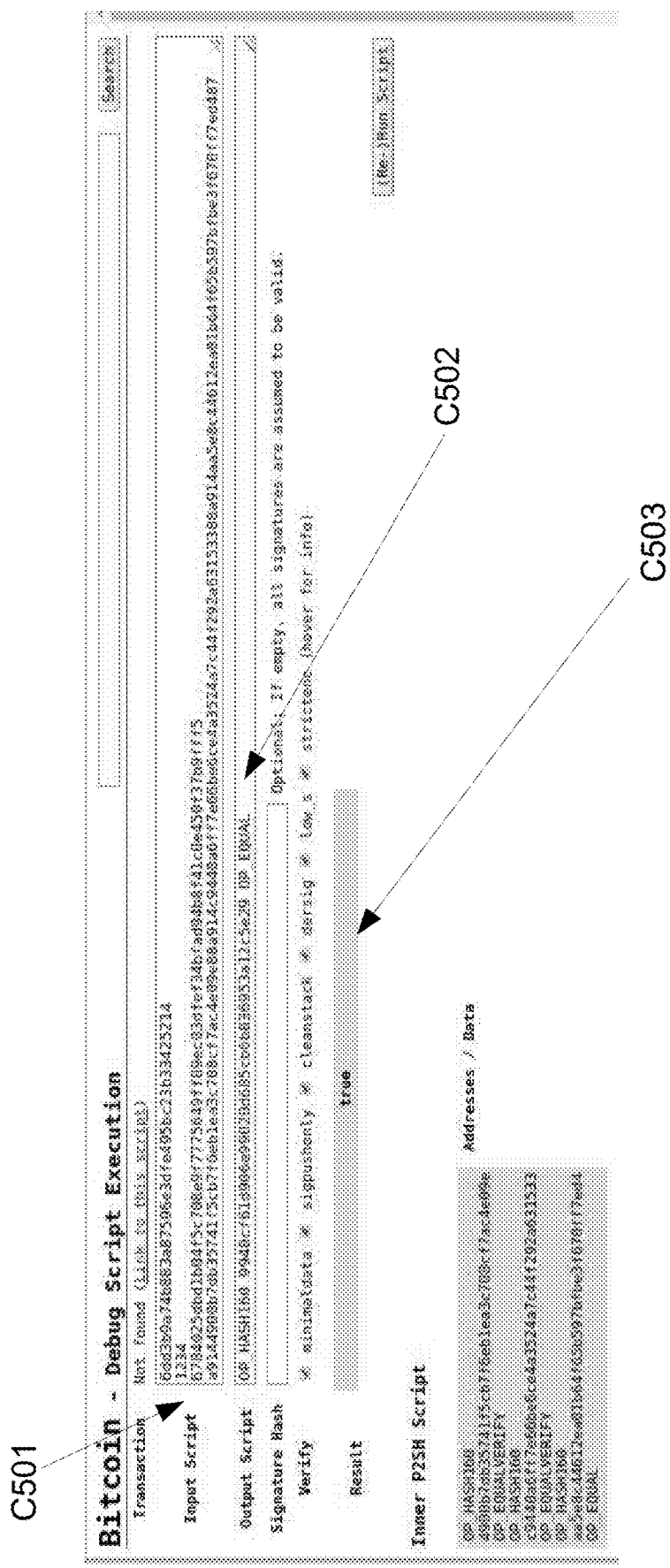

The executed blockchain transaction output for example in debug environment is shown in FIG. 5C.

In the example embodiment, one smart contract is used along with disclosed method, however, in other embodiments, one or more smart contracts can be used with disclosed methods.

Using Smart Contract with Signature Verification in Redeem-Script

Consider a situation of using disclosed methods, by a valid user more than one times for the same blockchain address. After the first transaction execution, the transaction output data available in public records of blockchain will have inputs given for transaction.

Due to this any user can attack the address and withdraw funds from the blockchain address next time. This can be overcome by building in dependency of signature verification in redeem-script. Then the user who wants to redeem may need to provide signature each time to redeem from the blockchain address. This will prevent an attack on blockchain address.

This is achieved by using method "Using one or more smart contracts" as shown in FIG. 2C, wherein <custom-contract> is
OP_DUP
OP_HASH160<pubKeyHash>OP_EQUALVERIFY
OP_CHECKSIG
requiring <custom-input> of <sig> <pubKey>
where <pubKey> owner has to sign for the transaction.
<sig> is the signature of <pubKey> owner.

In the above method, the <custom-contract> will verify the signature and also the hash of the public-key of the redeeming user.

The example provided in FIG. 3C can be used for implementing this method.

Controlling Various Type of Blockchain Devices

The blockchain-devices could be any electronic device connected to moving object, financial transaction, device management, license management, usage management, industrial processes, drones, valves, switches etc, having the ability to interact with blockchain.

The type of blockchain-devices may be broadly classified based on the type of activity consisting of activities like financial activity, asset activity, device activity, movement activity, game activity. The performed activity may be to lock, unlock, start, stop, create, delete, update, remove, empty, add, transfer, issue depending on the type of activity.

For controlling these devices, the design of control-codes, custom-contracts has to be done and used as described in this disclosure.

The type of control-codes for each type of blockchain-device activity may vary. There may need to normalize certain control-codes. The designer of the solution in each domain has to take into account these factors.

Appropriate communication channels need to be established with blockchain-devices or its accessories, doing appropriate transformation for each of the channels.

Coupling Controlling System Logic with Blockchain-Device

There are applications where the blockchain-device need to transact with controlling-system multiple times using same UID-key.

Then a relation is established between the two to use a common variable, in composite-key. The common variable is changed each time before using. This results in new blockchain address each time.

The value of the common variable may be obtained by programming logic or using some common data or sharing the common data in a different channel like email or SMS etc.

This is called coupling blockchain-device with controlling-system.

This will facilitate the same UID-key to be used multiple times, without compromising on the security of blockchain-addresses.

Consider an example, wherein a supplier wants bill payment to happen to each bill separately through blockchain using one UID-key for each customer.

The supplier would create unique bill no for each bill.

The customer would want to pay bills separately for each bill, using same UID-key.

In this example, the customer will create composite-key made from <billno>$_{hashhash}$ and a PIN. So each time, the bill will be paid to a unique address generated using <billno>$_{hashhash}$ and a PIN.

After the bill is paid, the customer would inform the supplier to withdraw using the given PIN. This is an arrangement between supplier and customer, wherein they are supposed to keep UID-key and PIN secret.

The supplier would withdraw using a PIN, and <billno>$_{hashhash}$ which he would have.

This is a simple example to demonstrate coupling for multiple transactions between two users.

In an ideal solution, there should be a condition for redeeming user to provide a signature in order to withdraw. This can be done using the disclosed method "using smart contract with signature verification", in this disclosure.

3.0 Communication System

The communication system is a mechanism to connect the controlling-data created by controlling-system to blockchain-device. This may include the operators of controlling-system and also the accessories connected to blockchain-device.

In FIG. 1A, the communication-system A102 to collect the one or more sets of blockchain-device controlling-data from controlling-system and make it available in a way consumable by the blockchain-device A105 or its accessories A104. Wherein the accessories may get input from users, devices connected to blockchain-device. This is further shown in FIG. 9A.

The blockchain-device controlling-data may comprise, metadata, redeem-script, P2SH address, UID-key, composite-key, control-codes. The metadata here represents both composite-key-metadata, control-code-metadata.

In situation of using smart contracts, the blockchain-device controlling-data may comprise, metadata, redeem-script, P2SH address, UID-key, composite-key, control-codes, contract-input. The metadata here represents composite-key-metadata, control-code-metadata, contract-input-metadata.

The composite-key may be created by merging one or buffer of control-codes to UID-key.

The redeem-script may be created from composite-key. In other embodiments, redeem-script might be created by concatenating one or more custom-contracts, with appropriate result verification scripts in between.

The redeem-script, the P2SH address is created by controlling-system using methods described in the disclosure.

The communication-system A902 may collect the controlling-data A901 in any of the communication mediums like wired, wireless, electronic cards, printed cards etc. One or more parts of controlling-data, control-codes may be made available through different communication channels like SMS, email to users A903, A904.

The blockchain-device may need to get that control-code from the accessories connected to blockchain-device.

Some of the data needed by blockchain-device may need to be got from contextual information. The contextual information may be got from other external devices, sensors, electronic gadgets, mobile, the computer connected to blockchain-device. Appropriate normalization of data may need to be done for the data collected before using.

Some information which needs to be got from users like "date of birth", "date of joining", "first 4 digits of social security number". These may not be sent through communication-system.

Some of the user information may be biometric or biometric mapped user information. In such situations, mapped user information is used.

In some embodiments, at least one part of composite-key or at least one part of control-codes may be made available to blockchain-device in different communication channels.

Such information which needs to be got from external gadgets also need not be sent through communication-system. These are programmed in blockchain-device software to be obtained from accessories.

The information that the blockchain-device programmer's needs, for programming the device is got from metadata provided with controlling-data.

The communication system may send these data through channels like printed cards, plastic cards, electronic cards, email, internet, wifi, NFC, BluetoothBluetooth, SMS, mobile apps, electronic gadgets, IoT devices, client-server link, server-mobile link, device-device link, sharing of files, sharing of storage media, sharing of files on networks, sharing of data in the cloud etc.

The communication system may provide at least one part of controlling-data to blockchain-device through a different channel.

Some of the channels may be secure channels, some may be legitimate channels.

Appropriate transformation needs to be done to send/receive through these channels.

Example

QR-code transformation may be needed for scanning and sending data through QR-code devices.

Email transformation may be needed for data to be sent through the email system.

File transfer transformation may be needed if data is to be sent through file transfer mechanisms.

Connecting Multiple Accessories Connected to Blockchain-Device

The blockchain-device may need input from one or more accessories connected to blockchain-device. In such cases, the communication-system may need to provide communication channels to each of the accessories.

Each of the channels may need a mechanism to read the data, transform the data. The communication system to provide appropriate digital transformations to make the data consumable from accessories.

Sending Part of Controlling-Data in a Different Channel

Some part of the blockchain-device controlling-data needs to be sent through the different channel to provide scope for different usage scenarios and also provide for secure usage.

Figure 1C:
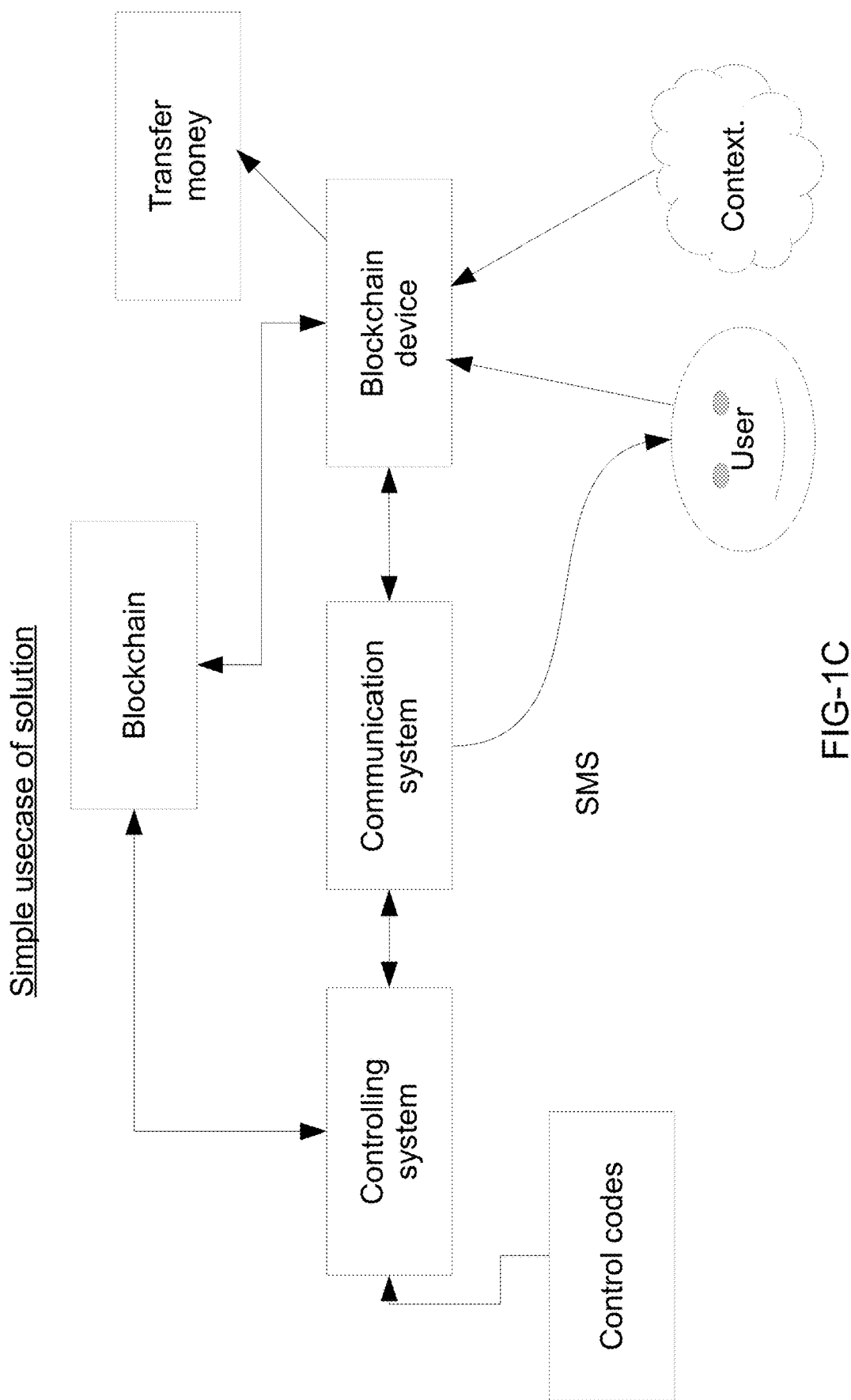

In the example provided in FIG. 1C, the controlling-system has sent the part of controlling-data (control-code) OTP (by SMS) to the user. The blockchain-device gets the OTP from the user. Using this OTP the blockchain-device may perform the transaction.

This is an example of sending by the different channel. This is also the example of the computing system using part of controlling-data to control blockchain-device.

In other embodiments, the control-codes can be sent through different channels like email etc.

In other embodiments, other parts of blockchain-device controlling-data can be sent through different channels.

Receiving and Transforming Controlling-Data

In some big installations like banks, controlling-data may be received on servers, tapes, hard disks etc. This will then be processed for consumption by various blockchain-devices held by different users, different systems in their respective formats.

Example: One blockchain-device may need data in QR-code format, another may need data in email format etc.

The data collected by the server is converted to formats needed by the respective blockchain-device user.

Sending Controlling-Data to Blockchain-Devices

The blockchain devices may scan barcodes, QR-codes etc, to initialize. The communication system to provide controlling-data in a consumable format for consumption by blockchain-devices.

In some blockchain-device usages, the controlling-data may be loaded from tapes, servers, files etc. Then the blockchain-device may be initialized and configured using loaded data. In such scenarios, the communication system may provide controlling-data in the format required by servers, tapes etc.

4.0 the Blockchain-Device

The blockchain-device is a device connected to the blockchain, through the electronic network. The electronic network may be wired network or wireless network.

The blockchain-device goes through a process of initializing, configuring, listening, taking input, performing the operation, then performing the activity.

During initializing phase, the blockchain-device is initialized with a UID-key and followed by that configuring is done, to make it listen to accessories.

Once the blockchain-device starts listening, it gets input from these accessories. Which is then processed to perform blockchain operations.

Blockchain operation is an operation done by blockchain-device based on blockchain information. This will trigger blockchain activity.

Blockchain activity is any blockchain device activity triggered after performing a blockchain operation.

Blockchain operations are normally, verification of correctness of data obtained, do at least one successful transaction, verify of at least one past transaction.

These are discussed in subsequent sections.

Blockchain-Device Reading and Initializing

The blockchain-device may read one or more set of controlling-data provided to it through the scanner, barcode reader, QR-code reader, files, servers, databases etc.

The blockchain-device may initialize itself or may get initialized by the external system. Each activity of blockchain-device is initialized with the corresponding UID-key provided to it. The associated redeem-script, partial control-codes, partial composite-key is applied to the processing unit of blockchain-device.

The blockchain-device with its associated accessories may be listening to inputs from users, other devices, terminals.

The blockchain-device may also have a display unit to display transaction status, amount of value transacted, the status of verification of rebuilt composite-key at blockchain-device.

Blockchain-Device Configuring

The blockchain-device B100 gets information from communication-system B101, using various channels of communication-system. The blockchain device manufacturer, using the metadata will create software for blockchain-device to make it operate using blockchain and data from accessories which may consist of user information and contextual information.

The process of making controlling-data usable by blockchain-device, by identifying which data has to be collected from which devices, which has to be collected from users, which communication channel to use is called configuring B102.

Once the blockchain-device is configured for its activity, it will be listening to collect information as needed from users or other devices. This is used to verify or perform the transaction.

The blockchain-device may be configured to take one or more different UID-keys. It may take fixed UID-key or dynamic UID-key. If it is fixed, it may be stored in the permanent storage on the device or permanent storage connected to the device. If the blockchain-device is configured to take dynamic UID-keys, then the blockchain-device may get the UID-key from scanner, QR-codes, email, client-server connection etc. For each of the UID-key, the blockchain-device may get some accompanying controlling-data.

The process of blockchain-device listening B103, processing operation B105, interacting B106 is shown in FIG. 1B.

Blockchain-Device Input

The blockchain-device may also be connected to different other accessories like electronic devices, terminals that provide information about the environment, operation, logistics, situation, contexts. This information is collectively identified as contextual information A906.

The blockchain-device may also get user-id, password, date of birth, place of birth etc from the user. This information is collectively identified as user information A904, A903. This may also have some contextual information.

Blockchain-Device Listening and Performing the Operation

The blockchain-device may listen B103 to the user or contextual information B104 as configured B102. Once the blockchain-device gets the user or contextual information, it may process B105 the data to check for correctness of data by building "rebuilt-composite-key". This is done as shown in FIG. 2B.

In FIG. 2B it can be seen, that after each change in user input, contextual input, the composite-key is rebuilt B202.

If the user and contextual data are correct, the operation may need user confirmation B205. After the user gives confirmation, the operation of performing transaction is done B206.

The other operation that could be done is to check any past transaction for the blockchain address B207.

Based on the output of above operations, the blockchain-device activity B107 is triggered.

Blockchain-Device Performing Activity

The blockchain-device once configured with UID-key, metadata, controlling-data B201, it will listen and take inputs from accessories B203 like users, devices, terminals and build the rebuilt-composite-key B202 as per instruction in metadata and test if it is correct B204. One of the ways to test is to build the P2SH address using rebuilt-composite-key to see if it matches given the P2SH address.

The blockchain-device may prompt the user or other devices for further instruction before execution B205. The blockchain-device may execute the transaction B206 and on the success of the transaction, the blockchain-device may perform blockchain-device activity B107.

In other embodiments, the blockchain-device may check if a transaction has happened in the past on the said P2SH address and decide to perform the blockchain-device activity.

The blockchain-device activity performed may be to lock, unlock, start, stop, create, delete, update, remove, empty, add, transfer, issue etc depending on the type of activity.

The type of activity may be like financial activity, device activity, movement activity, asset activity, game activity etc.

Some of the data obtained from accessories may need to be normalized before usage.

Blockchain-Device Taking Input from Accessories

The blockchain-device A905 may need to get input from accessories like users (A904, A903), contexts devices (A906). It is possible each of the users might have received one or more control-codes through different channels like SMS, email etc.

These inputs are provided to blockchain-device in the interface provided to users and other devices. These interfaces may be mobile apps, web terminals, application programming interfaces etc.

Blockchain-Device Rebuilding Composite-Key (Rebuilt-Composite-Key)

The block B202 in FIG. 2B creates rebuilt-composite-key. It takes controlling-data B201 and gets few sets of data from accessories B203.

Based on the metadata, the processing of data from accessories (user and context inputs) is done.

For the example considered, the metadata is shown in FIG. 6A.

The composite-key-metadata A606 gives details about composite-key (ie) the UID-key length is 66, it has 3 parts, "part1" starts at 0 and ends at 10, "part2" starts at 10 and ends at 20, "part3" starts at 20 till the end of UID-key. The sequence of how this data has to be arranged is shown as "Sequence" array having "part1, Userjson, pin, part3, company".

The control-code-metadata for "Userjson" is A602. It tells how "Userjson" is to be processed. It tells "stringify" function has to be used, it mentions "Buffer" function has to be used, the various fields of JSON data are indicated as "fields" array containing names "Login" and "Password". In the transformation field, the first field indicates no transformation, the second field indicates transformation (hash160 has to be done twice and converted to "hex").

Once the user input, the contextual input is processed as per the metadata, the output is created. This is shown in FIG. 6B. The rebuilt-composite-key is seen in B603.

The inputs taken are PIN="1234", Company="ABC". The "Userjson" being a JSON data, the password field is processed with hash160 twice and converted to "hex". This is shown in FIG. 6B, B602.

The buffer of control-code is merged into the buffer of UID-key at positions as mentioned in metadata A606.

Once all the merging of control-codes is done as required by metadata with UID-key, rebuilt-composite-key B202 is ready.

Blockchain-Device Using Rebuilt-Composite-Key as Redeem-Script-Input

The rebuilt-composite-key A801 is used as redeem-script-input A802 for transaction processing while redeeming from the P2SH address.

The redeem-script-input will be used to submit the transaction to miners to process. The miner would then validate redeem-script-input and redeem-script to confirm success or failure of the transaction.

Figure 7B:
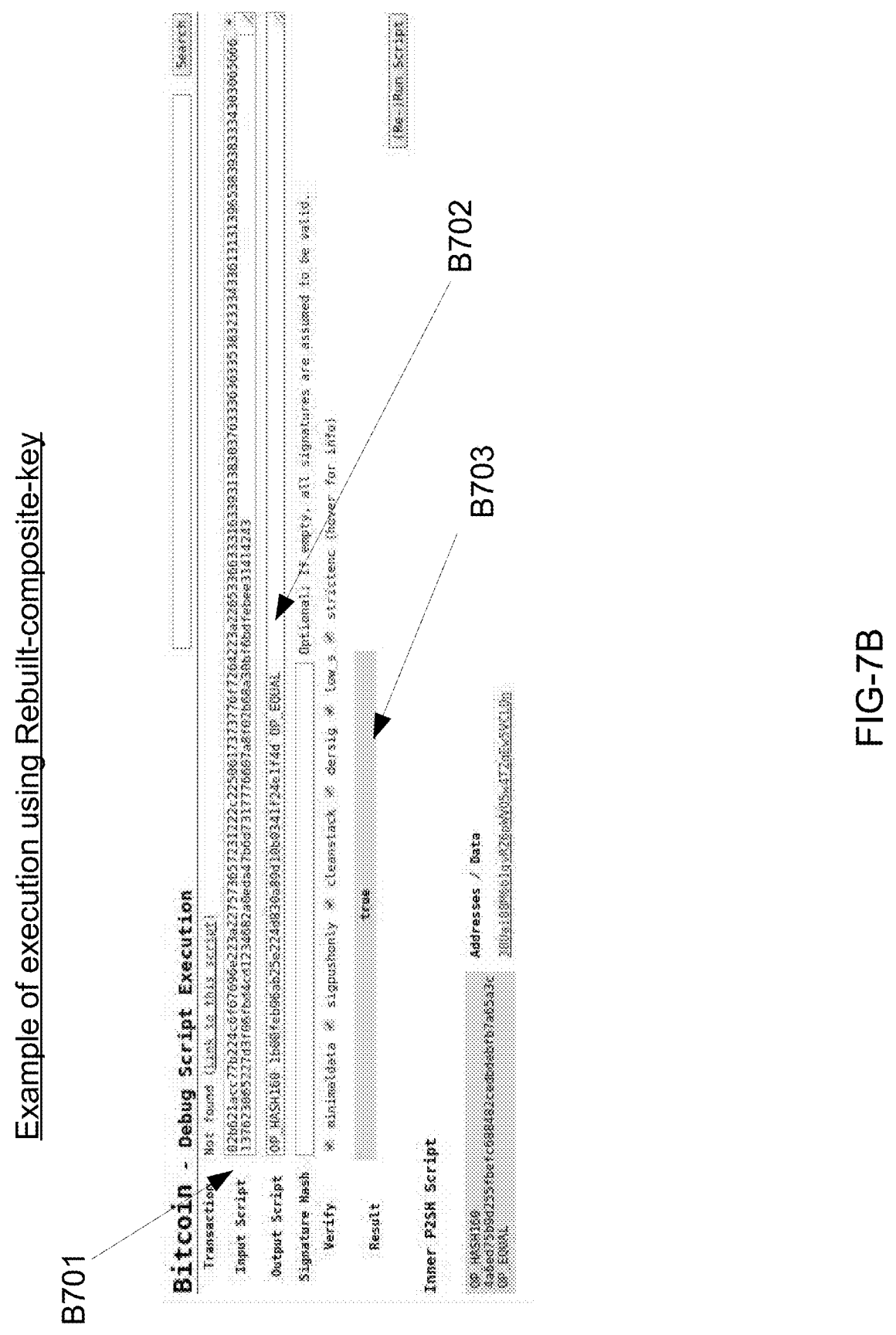

An example is shown using redeem-script-input in a debug environment in FIG. 7B.

The input for this transaction is generated in FIG. 6B.

In the example, B701 "Input script" has redeem-script-input and also redeem-script.

In the example provided, it can be seen in FIG. 7B, B703 indicates "true". Which means the transaction is successful in debug environment.

The "Output script", in B702 has the hash of redeem-script, which will be used to check if the provided redeem-script is correct. It also later executes the script taking redeem-script-input. If all goes well, the result will be a success. This is shown in B703.

The Blockchain-Device Verifying Correctness of Rebuilt-Composite-Key

The method to verify if the rebuilt-composite-key is correct is done by building P2SH address using rebuilt-composite-key. The rebuilt-composite-key would have been built by taking inputs from accessories and then computing as per metadata instruction.

If the P2SH address created matches the blockchain address provided, it can be inferred that the rebuilt-composite-key is correct.

If the rebuilt-composite-key is correct, then it can be inferred from the data provided by accessories and data with blockchain-device is correct.

Below is the javascript example to build P2SH address using rebuilt-composite-key:

```
var compositeKeyHash = bitcoin.crypto.hash160(rebuilt-composite-key);
var redeemScript =
bitcoin.script.compile([bitcoin.opcodes.OP_HASH160,
compositeKeyHash, bitcoin.opcodes.OP_EQUAL])
var scriptPubKey =
bitcoin.script.scriptHashOutput(bitcoin.crypto.hash160(redeemScript))
var address = bitcoin.address.fromOutputScript(scriptPubKey,
bitcoin.networks.testnet)
```

This verification will help in prompting user for confirmation before execution of transaction in blockchain.

This verification also helps in checking the past transaction of the blockchain-address when the matching happened.

Blockchain-Device Checking Past Transaction Using Rebuilt-Composite-Key

Some applications may be designed wherein past transaction of a P2SH address may be an indicator to allow performing of a current activity. In such a situation, once the rebuilt-composite-key is built is confirmed to be correct, the blockchain-device may check if a past transaction has happened for that blockchain address. Then it may decide to perform the blockchain-device activity.

Blockchain-Device Data Normalization

One or more control-codes that the blockchain-device uses may be a variable. In that situation, it needs to be normalized to make it useful.

Consider a situation, the blockchain-device inputs need to be mapped to ranges 0-500, 500-1000, 1000-1500, 1500-2000.

These may be called range-1, range-2, range-3, range-4.

Assume a data 512 has to be mapped.

Then by normalization, 512 will be mapped to "range-2".

The "range-2" tag can be used to represent 512 while processing the variable in composite-key.

Blockchain-Device Configured for Multiple Activities

A blockchain-device may be configured for multiple activities, with each activity represented by the different address, different control-code, different metadata. The blockchain-device will be listening for inputs corresponding to each of the addresses. Then after processing inputs for each of the blockchain address, corresponding activity for that blockchain address may be performed.

Each of the blockchain address may be derived from same UID-key or different UID-keys.

When a blockchain-device is associated with multiple addresses, it may so happen, some of the addresses may be activated, some may not be activated etc. Accordingly, activities associated with these addresses will vary.

Blockchain-Device Activation Based on Value, State of Blockchain Address

The controlling-data associated with blockchain device will get activated as and when a blockchain value is deposited into blockchain address.

This will make the blockchain-device execution dependent on spending that value in blockchain address, to successfully do the transaction.

Some blockchain device activities may be triggered based on blockchain value(like bitcoin value) in the blockchain address.

Some blockchain device activities may be triggered based on the certain state of blockchain address.

State Trigger:

The various states of blockchain address that could trigger the blockchain device activity are the following state of blockchain address not having any record in the blockchain
    state of blockchain address having zero value
    state of blockchain address having some value
    state of blockchain address after transacting some value
    state of blockchain address after at least one past transacting State Trigger Example Consider a situation where a blockchain address is given to a blockchain-device. The blockchain-device finds there is no entry in blockchain for that address. This shows that the controlling-system has not activated the blockchain address. This indicates that blockchain-device is yet to get activated (the state is "blockchain address not having any record in blockchain").

In the above example, the operation corresponding to state "blockchain address not having any record in blockchain" is triggered by the blockchain address.

Value Trigger:

A blockchain activity may depend on certain value to be found in blockchain address. In such situations, only when the value is found the activity gets triggered.

Value Trigger Example

Consider a situation, where a financial transaction should happen only if a particular amount is found in the blockchain-address. In this application when a required blockchain value is deposited into the blockchain address, the financial transaction gets triggered.

In the above example, the operation is triggered based on the value of blockchain address.

Blockchain-Device Accepting One or More Smart Contract Inputs

Any smart contract (custom-contract) that is known to work and is integrated with disclosed method of controlling blockchain device, such systems may need to take <custom-input> needed by <custom-contract> for redeeming the smart contract.

This can be done by providing <custom-input> after the composite-key for redeem-script-input.

This is shown in example FIG. 4C, FIG. 5C. OTP is part of rebuilt composite-key, while Pin1 and Pin2 is part of <custom-input>.

This can be seen in FIG. 4C, line C407, the composite-key shows, the first 4 characters "6784" represents OTP attached at the beginning of UID-key. The UID-key can be seen in line C406.

The content of line C407 is shown below
6784025dbd1b04f5c708e9f7775649ff89ec03dfef34bfad94b8f41c0e450f37b9fff5

The combined input (<custom-input> and composite-key) can be seen in line C409 in FIG. 4C.

The <custom-input> can be seen in FIG. 5C, "Input script" section C501. The Pin1 is in raw format, Pin2 is in hashed format.

The result "true" C503, in FIG. 5C, indicates that the transaction is successful in the debug environment.

In the example above, one smart contract input is used along with disclosed method, however, in other embodiments, many smart contract inputs can be used.

Blockchain-Device Using the Signature in Smart Contract Input.

Consider a situation of using disclosed methods, wherein a valid user wants to use same P2SH address more than one time. After the first transaction execution, the transaction output data available in public records of blockchain will have inputs given for transaction. This will create vulnerability to attack blockchain address.

To overcome this the blockchain-device could share a public-key part of random Key Pair created by Elliptic Curve Digital Signature Algorithm, with the controlling-system. Which would then be used to create a dependency of signature of public-key owner to spend value in blockchain address by controlling-system. This dependency of signature will prevent an attack on blockchain address.

In that situation, the owner of the public-key may need to sign the request to redeem. This ownership will be verified by the miners while validating redeem-script and redeem-script-input.

If the signature verification <custom-contract> is
OP_DUP OP_HASH160 <pubKeyHash>OP_EQUALVERIFY OP_CHECKSIG The corresponding <custom-input> will be <sig><pubKey> where <pubKey> owner has to sign for the transaction.

Then the redeem-script-input using smart contract input will be
<sig><pubKey><composite-key>

The above is similar to the combined input (<custom-input> and composite-key) that can be seen in line C409 in FIG. 4C.

Various Type of Blockchain-Devices

The blockchain-devices could be any electronic device connected to moving object, financial transaction, device management, license management, usage management, industrial processes, drones, valves, switches etc, having the ability to interact with blockchain.

The type of blockchain-devices may be broadly classified based on the type of activity from a list of activities like financial activity, asset activity, device activity, movement activity, game activity. The performed activity may be to lock, unlock, start, stop, create, delete, update, remove, empty, add, transfer, issue depending on the type of activity.

Coupled Blockchain-Device

In applications where the blockchain-device need to use same UID-key multiple times with another user (controlling-system), a relation is established between the two to use a common variable, in composite-key. The common variable is changed each time before using. This results in new blockchain address each time.

The value of the common variable may be obtained by programming logic or using some common data or sharing the common data in the different channel like email or SMS etc.

This is called coupling blockchain-device with controlling-system.

This will facilitate the same UID-key to be used multiple times, without compromising on the security of blockchain-addresses.

5.0 Computer Program Product for Controlling Blockchain-Device

A computer program product, namely a computing system B809 consisting of software connected to the computer-readable (storage) medium which is non-transitory namely blockchain, consisting of processors, memory, hard disk, the network wherein one or more methods of processing controlling-system B801 to control one or more computing devices called blockchain-devices B807. One or more control-codes may be taken from terminals B804. One or more parts of controlling-data being stored in servers and databases B803, one or more parts given to other accessories B806 connected to blockchain-device. One or more parts of controlling-data sent through communication channels of communication-system B802 to blockchain device B807. The execution of blockchain device to depend on data in blockchain address.

A computer program product, namely a computing system B810 consisting of software connected to the computer-readable (storage) medium which is non-transitory namely blockchain B808 and running on blockchain-devices B807 that can configure themselves or get configured by external devices, or other computing systems B805. The blockchain devices to get contextual information from accessories B806. One or more systems to process and check if the data received from accessories against the data of blockchain address. The blockchain-device may prompt the user and perform the transaction. The blockchain-device may perform an action (activity) based on the success of the transaction. The blockchain-device may perform an activity based on correctness of data entered. The blockchain-device may perform an action(activity) based on at least one past successful transaction.

The one or more computing systems comprising of controlling-systems, communication-systems, blockchain-devices running on systems having software connected to the computer-readable (storage) medium which is non-transitory namely blockchain with processors, memories, hard disks, networks.

The one or more computing systems of blockchain running on one or more nodes of computer-readable (storage) medium which is non-transitory namely blockchain, they being connected through wired or wireless networks.

6.0 Blockchain-Service for Controlling Blockchain-Device

A controlling-blockchain-service B903 to provide controlling-data for various type of control-codes that can be taken from terminals B904, that can be used to control blockchain-devices B907, that can happen through communication-systems that are connecting blockchain-devices.

The controlling-blockchain-service B903 being provided by one or more computing systems connected to the controlling system running methods or processes of creating controlling-data.

The blockchain-device B907 connected to device-blockchain-service B905 getting one or more set of data from accessories B906 connected to blockchain-device through communication-system B902.

The device-blockchain-service to provide one or more computing services to blockchain-device which has one or more methods or processes needed by the blockchain-device and accessories.

7.0 Use Cases

Use Case: Device Execution by a User at Specific GPS Location

Assume a blockchain-device connected to blockchain has to be executable, based on a PIN and a specific GPS location. The control-codes specific to GPS and PIN is processed using disclosed methods to create blockchain address. The blockchain address is activated. The blockchain-device is provided with controlling-data.

The PIN is sent in the different channel to blockchain-device, say by SMS to the user. The blockchain-device is capable of getting GPS as contextual information.

The blockchain-device will take the PIN from user and contextual-input from GPS location. Then perform the transaction using GPS and PIN. If the PIN or GPS is wrong, the composite-key will be wrong and the transaction will fail.

This will ensure the device execution happens only in specific GPS location and in the presence of the user with the PIN.

Use Case: Drone Unlocking at Specified GPS Location

Assume a drone is programmed to unlock a consignment at a specific location. Using disclosed methods, the location to unlock is secretly programmed inside blockchain address. Then blockchain address is activated.

The drone blockchain-device will keep getting GPS context information and feeding it to blockchain-device for performing the transaction. As soon as it reaches specified location, the transaction will be successful, using location GPS data. Then the drone may unlock consignment.

If the drone reaches the wrong location, the GPS data won't match the required GPS coordinates, so transaction won't be successful and hence the drone may not unlock the consignment in the wrong location.

Use Case: Money Transfer/Coupon Transfer.

Assume a money transfer coupon has to be issued, which should be encashable by any coupon encashing device.

Using disclosed methods a control-code is created, which may be an OTP. Using the control-code, blockchain address and controlling-data are created. The OTP is sent to the user by SMS. The coupon controlling-data may be printed as a QR-code. The blockchain-address is activated.

For redeeming, the coupon holder will then submit the coupon for a coupon encashing device. The coupon encashing device would scan the QR-code, then it may prompt the user for OTP. Once the user provides the OTP, the coupon encashing device could perform the transaction and encash the coupon.

Use Case: Document Signing with Multiple Conditions.

Assume an authority needs to get a record of the document being signed in a specific place, by a specific person.

The person is identified by "OTP" sent to his mobile phone. The said document is identified by its hash. The said place is identified by its GPS coordinates.

Upon identifying the above items by authority, the below string is created <OTP-person-1><GPS-loc><doc-hash><UID-key>

Using disclosed methods blockchain address and controlling-data is created. The blockchain address is activated. The user's mobile app acts as a blockchain-device. It will obtain some of the controlling data.

The UID-key is assigned to mobile app of the user. This is done by scanning a QR-code of controlling-data. The mobile app will get SMS with OTP. The GPS location is taken automatically by mobile. The document hash is verified with provided hash.

The user will then confirm in the mobile app of the agreement. The transaction is performed in the blockchain. This ensures the document is signed under provided conditions.

Use Case: Multi-User Validation.

Assume a service needs approval from 3 users.

Using disclosed method multi-user, the name-code pair is created in JSON format.

This JSON data is converted to blockchain address and activated using disclosed methods.

Each user is sent their respective codes through SMS. Each user will provide the code received. The service validator has a blockchain-device in the web application, which accepts code each of the users has received.

Once all the users have provided codes the web application performs the transaction, to redeem value in blockchain address. This will validate all users having received the validation-code and approved. If a user does not want to approve, he will not give the code. This will ensure multi-user approval.

In the disclosure, the examples and descriptions involving the bitcoin system are provided as an example in the foregoing. However, embodiments of the present disclosure are not limited to "bitcoin". The embodiments of the present disclosure are employed for explaining certain concepts. Modifications to embodiments of the disclosure are possible without departing from the scope of the disclosure as defined by the accompanying claims. Expressions such as "including", "comprising", "incorporating", "consisting of, "have", "is used to describe and claim the present disclosure are intended to be construed in a non-exclusive manner, namely allowing for items, components or elements not explicitly described also to be present. Reference to the singular is also to be construed to relate to the plural.

I claim:

1. A method of controlling a blockchain device by a controlling system comprising:
   creating an at least one composite-key a unique identification key, wherein at least one control code is merged with the unique identification key to create the composite-key;
   processing the composite-key to create a redeem-script, and a blockchain address;
   wherein the redeem-script is capable of verifying a hash of the composite-key;
   receiving the at least one control code to create at least one part of a controlling-data;
   sending the at least one part of the controlling-data through a communication system;
   wherein the controlling-data is defined as the redeem-script, the blockchain address, the at least one control code, a metadata, and the unique identification key.

2. The method of claim 1, wherein coupling is established between the controlling system and the blockchain device by having an at least one common changing variable between the controlling system and the blockchain device.

3. The method of claim 1, wherein an at least one smart contract is used with the redeem-script to make the execution of the redeem-script depend on the smart contract and a smart contract input.

4. The method of claim 1, wherein the at least one part of the controlling-data is kept in a storage system wherein the storage system is selected from a group consisting of a hard disk, a storage area network, files, servers, network file systems, distributed file systems, interplanetary file systems, databases, ROMs, flash memory, and virtual machines.

5. The method of claim 1, wherein a blockchain transaction is performed.

6. The method of claim 1, wherein a computing system uses part of the controlling-data to control the blockchain device.

7. The method of claim 1, wherein at least one part of the control code is hashed at least one time before merging with the unique identification key.

8. The method of claim 3, wherein the smart contract verifies at least one signature to perform the blockchain transaction.

9. The method of claim 1, wherein at least one part of the control code is created by stringifying at least one javascript object notation data.

10. The method of claim 1, wherein the redeem-script to verify the composite-key is embedded in the blockchain address of the blockchain.

11. A method of executing a blockchain device, wherein the blockchain device is identified by an at least one unique identification key, the blockchain device using at least one part of controlling-data, wherein the controlling-data is defined as a redeem-script, a blockchain address, a set of control codes, a metadata, and a unique identification key;
   wherein the redeem-script depends on a redeem-script input and the at least one composite-key;
   the blockchain device:
   performing at least one blockchain transaction;
   building at least one composite-key using data from accessories;
   verifying at least one rebuilt composite-key;
   receiving at least one part of controlling-data from the communication system;
   wherein the blockchain device that can additionally perform at least one operation wherein the operation is selected from a group of operations selected the group consisting of:
   verifying the correctness of composite-key,
   performing at least one blockchain transaction, and
   verifying at least one past blockchain transaction.

12. The method of claim 11, wherein the blockchain device takes at least one smart contract input along with the at least one composite-key.

13. The method of claim 11, wherein a block chain activity is triggered based on the value in blockchain-address.

14. The method of claim 11, wherein a block chain activity is triggered based on the state of a blockchain address wherein state is selected from a group of states consisting of,
   the state of blockchain address not having any record in the blockchain,
   the state of blockchain address having zero value,
   the state of blockchain address having some value,
   the state of blockchain address after blockchain transacting some value,
   the state of blockchain address after an at least one past blockchain transaction.

15. The method of claim 13, wherein an activity type is selected from a group of activity types consisting of a financial activity, an asset activity, a device activity, a movement activity, a game activity wherein the performed activity is selected from a group of activities consisting of activity to lock, unlock, start, stop, create, delete, update, remove, empty, add, transfer, and issue.

16. A communication system connecting a controlling-system to at least one blockchain device comprising:
   at least one composite-key and a unique identification key;
   wherein at least one control code is merged into the unique identification key to create the at least one composite-key;
   the at least one composite-key processed to create a redeem-script, and a blockchain address;
   wherein the redeem-script is capable of verifying a hash of the composite-key;

the controlling-system sending an at least one part of a controlling-data to execute the at least one blockchain device;

wherein the controlling-data is defined as the redeem-script, the blockchain address, the control codes, a metadata, and the unique-identification key.

17. A controlling system of a blockchain device implementing the method of one of claim 1 to claim 10.

18. An execution system of a blockchain device, implementing the method of one of claim 11 to claim 15.

19. A non-transitory machine-readable storage medium having instructions embodied thereon, the instructions being executable to cause one or more processors to perform the steps of the computer-implemented method comprising of hardware, software, storage, electronic devices, implementing methods described in claim 1.

20. A non-transitory machine-readable storage medium having instructions embodied thereon, the instructions being executable to cause one or more processors to perform the steps of the computer-implemented method comprising of hardware, software, storage, electronic devices, implementing methods described in claim 11.

* * * * *